(12) United States Patent
Ikegami et al.

(10) Patent No.: US 7,636,219 B2
(45) Date of Patent: Dec. 22, 2009

(54) MAGNETIC RECORDING AND REPRODUCING APPARATUS AND MAGNETIC RECORDING AND REPRODUCING METHOD

(75) Inventors: Tomohiro Ikegami, Kanagawa (JP); Hiroyuki Ino, Tokyo (JP); Toshiyuki Nakagawa, Kanagawa (JP); Tomoyuki Hiura, Kanagawa (JP); Norihito Mihota, Saitama (JP); Masaaki Hara, Tokyo (JP); Yoshihiko Deoka, Tokyo (JP); Hidetoshi Honda, Miyagi (JP); Shinichi Fukuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 430 days.

(21) Appl. No.: 11/732,403

(22) Filed: Apr. 3, 2007

(65) Prior Publication Data

US 2007/0242378 A1 Oct. 18, 2007

(30) Foreign Application Priority Data

Apr. 14, 2006 (JP) ............................. 2006-111899

(51) Int. Cl.
G11B 15/18 (2006.01)
(52) U.S. Cl. ............................. 360/69; 360/26; 360/39; 360/48
(58) Field of Classification Search ........................ None
See application file for complete search history.

(56) References Cited

U.S. PATENT DOCUMENTS 4,438,465 A * 3/1984 Moriya et al. ................. 360/22

| | | | | |
|---|---|---|---|---|
| 5,546,247 A * | 8/1996 | Fujioka et al. ........... 360/77.13 |
| 7,126,890 B2 | 10/2006 | Learned et al. |
| 2004/0037202 A1* | 2/2004 | Brommer et al. .............. 369/94 |
| 2004/0080855 A1* | 4/2004 | Tsuchiya et al. ......... 360/73.04 |

FOREIGN PATENT DOCUMENTS

| | | |
|---|---|---|
| JP | 03-116403 | 5/1991 |
| JP | 03-116404 | 5/1991 |
| JP | 03-116405 | 5/1991 |
| JP | 04-370580 | 12/1992 |
| JP | 05-20788 | 1/1993 |
| JP | 10-283620 | 10/1998 |
| JP | 2002-157710 | 5/2002 |
| JP | 2002-044051 | 8/2002 |
| JP | 2002-216313 | 8/2002 |
| JP | 2003-132504 | 5/2003 |
| JP | 2003-338012 | 11/2003 |
| JP | 2004-071014 | 3/2004 |

* cited by examiner

*Primary Examiner*—Jason C Olson
(74) *Attorney, Agent, or Firm*—Robert J. Depke; Rockey, Depke & Lyons, LLC

(57) ABSTRACT

A magnetic recording and reproducing apparatus is disclosed which includes: a recording device configured to record with a write head a plurality of tracks constituting a unit of signal processing for data detection, to magnetic recording media; a reproduction device configured to reproduce with a read head a plurality of reproduction signals concurrently from the plurality of tracks on the magnetic recording media in different positional relations to the tracks, the reproduction signals being arranged into that one unit for signal processing thereby generating the track-specific reproduction signals; and a phase alignment device configured to align phases of record signals between adjacent tracks among the plurality of tracks recorded by the recording device to the magnetic recording media.

23 Claims, 30 Drawing Sheets

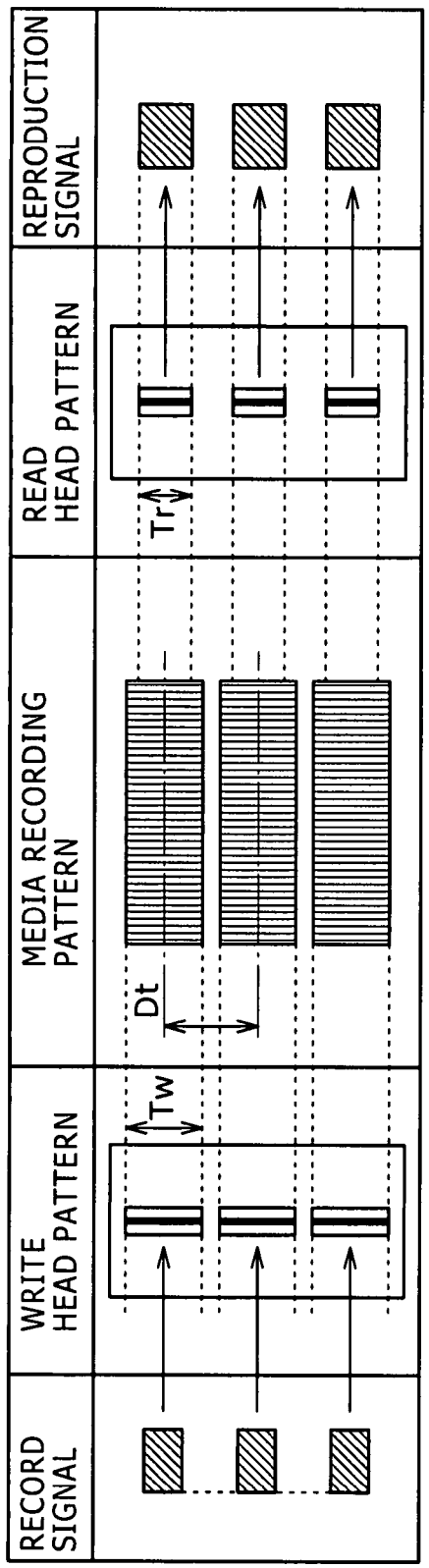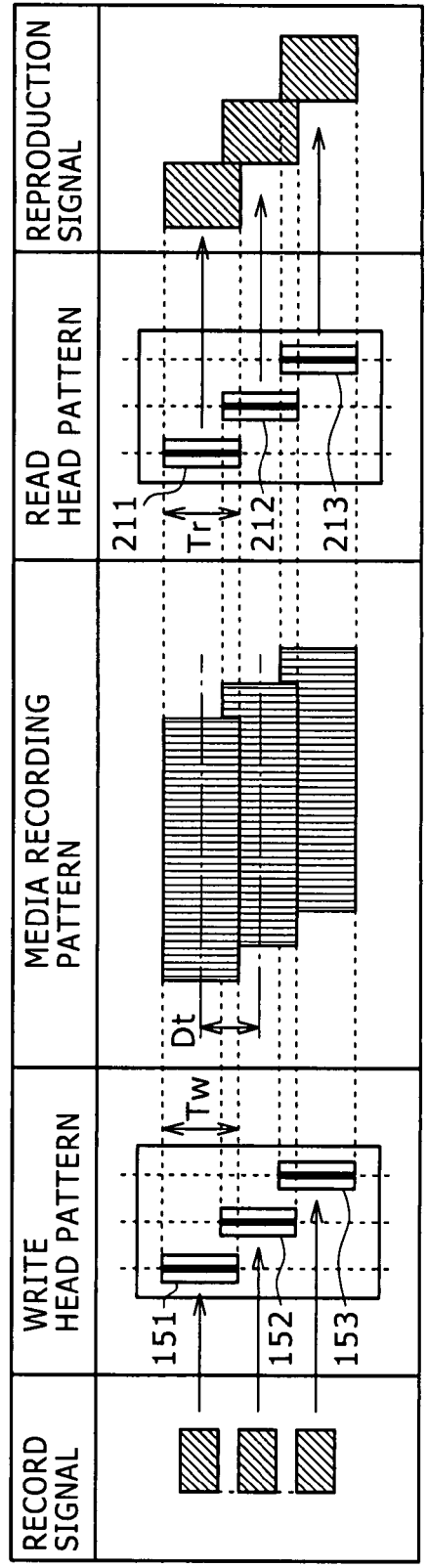

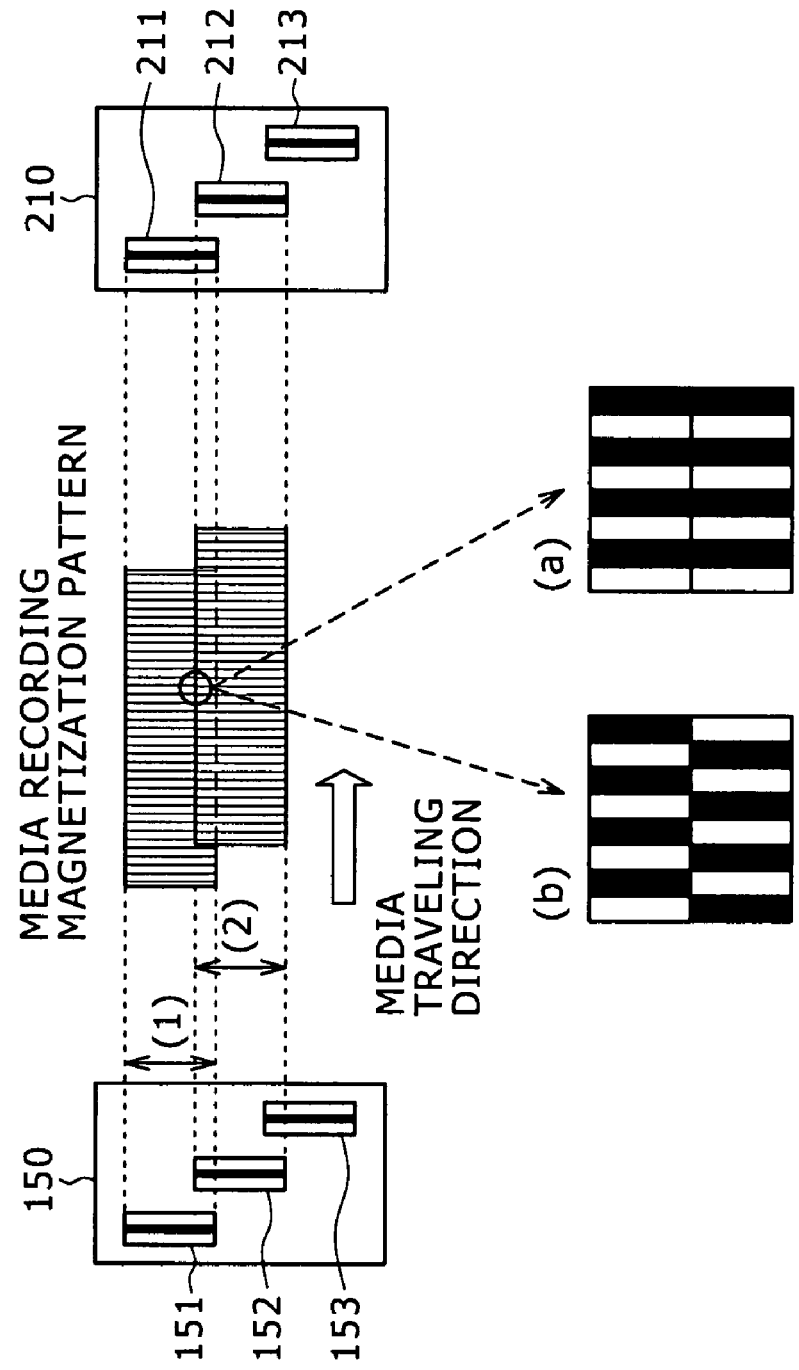

WAVEFORM FROM IN-PHASE SUPERPOSITION

WAVEFORM FROM 180-DEGREE OUT-OF-PHASE SUPERPOSITION

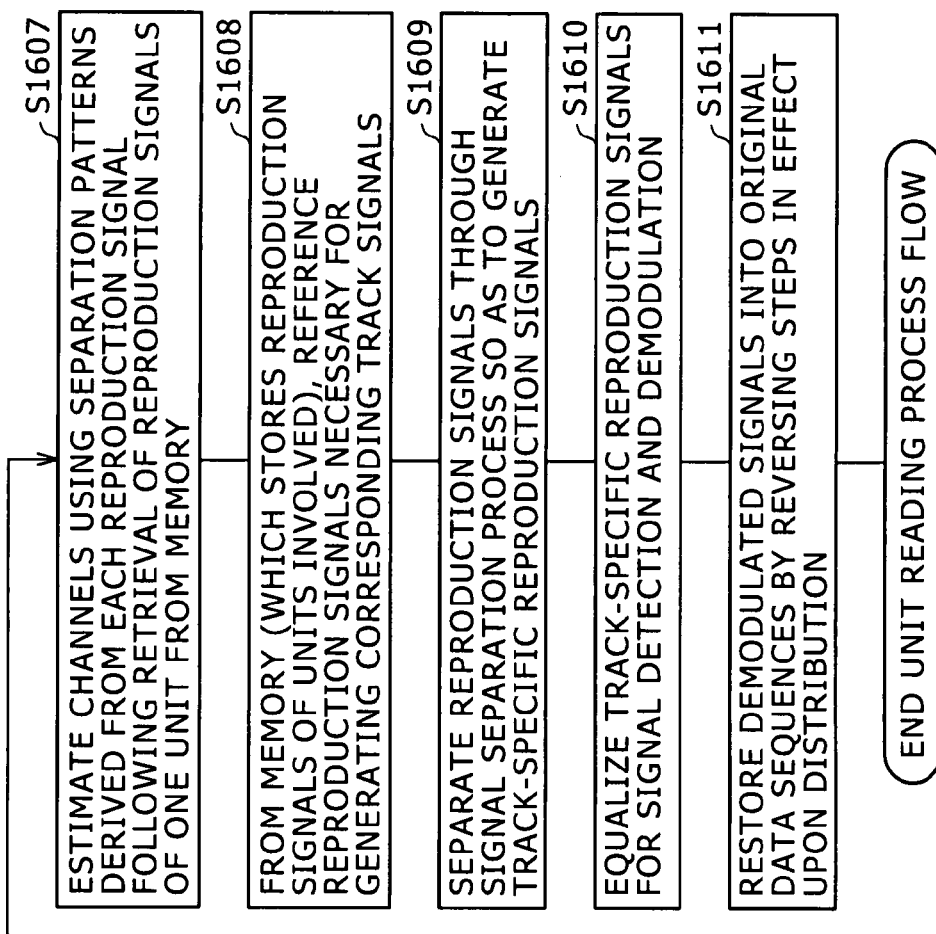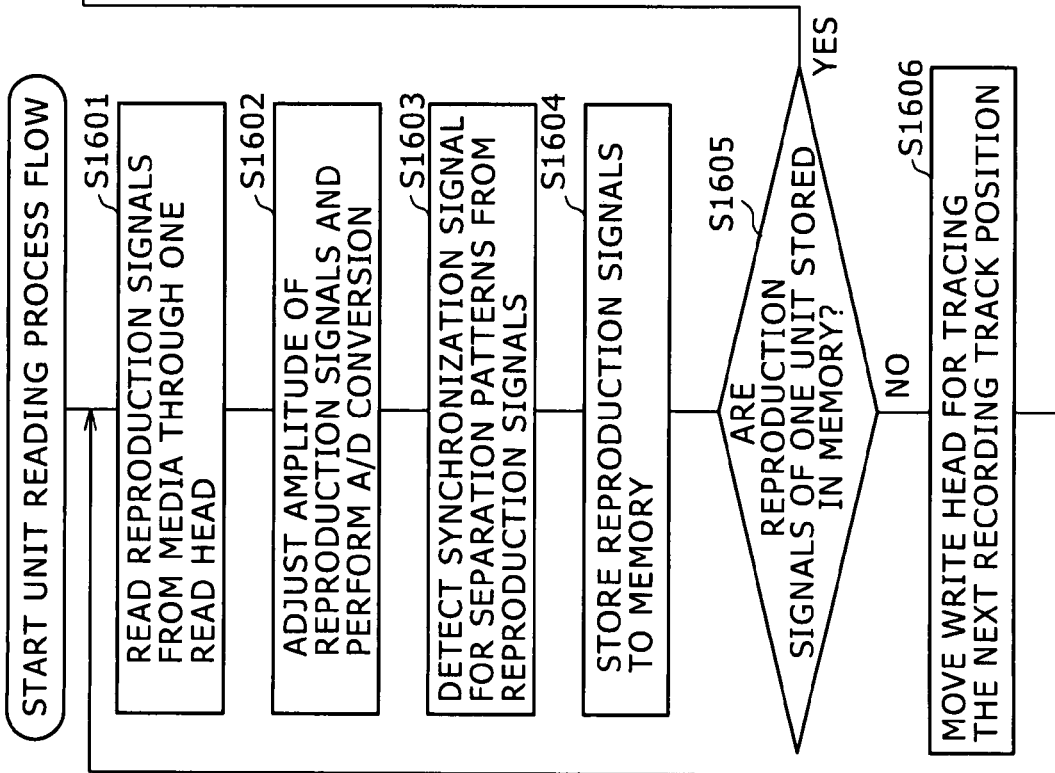

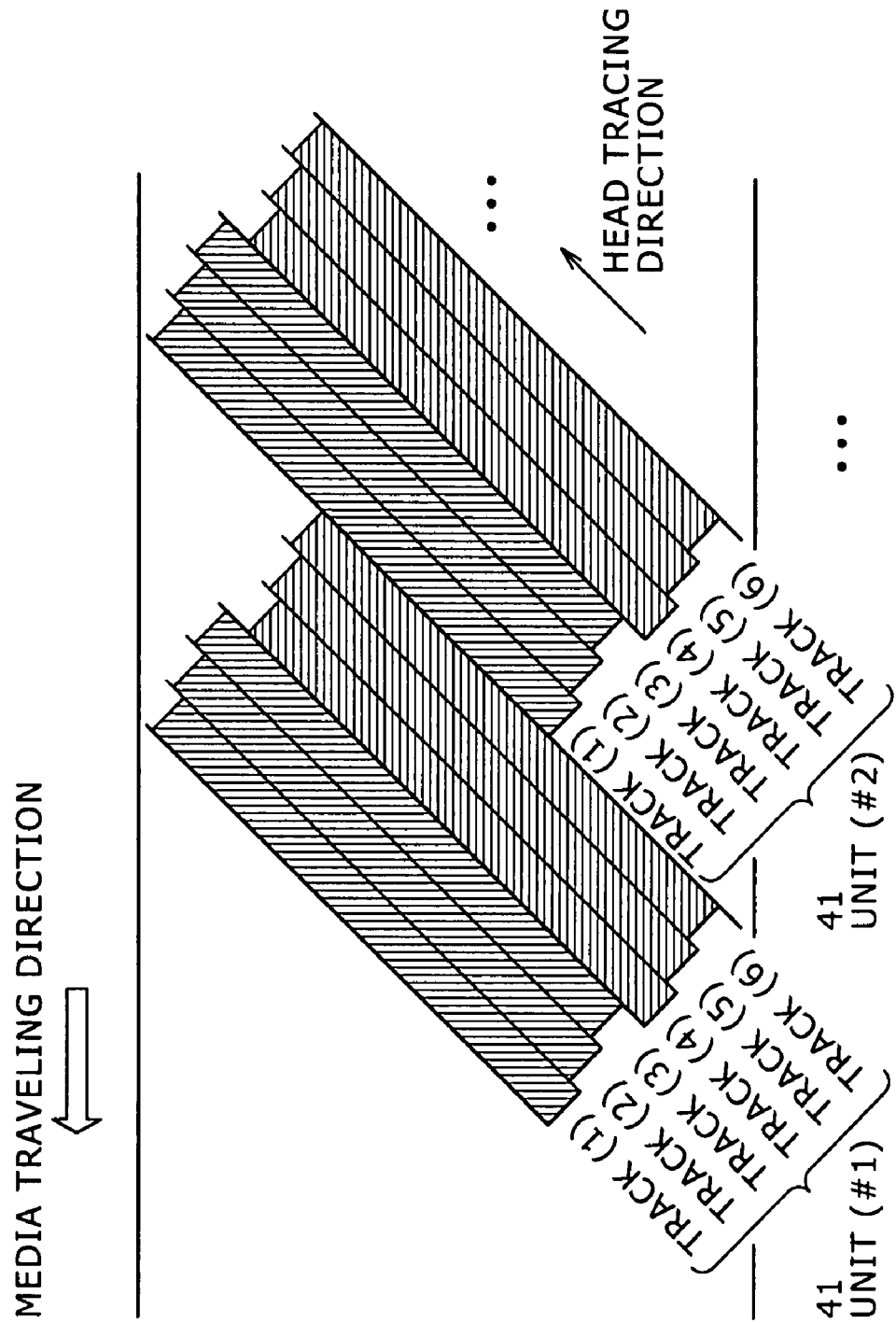

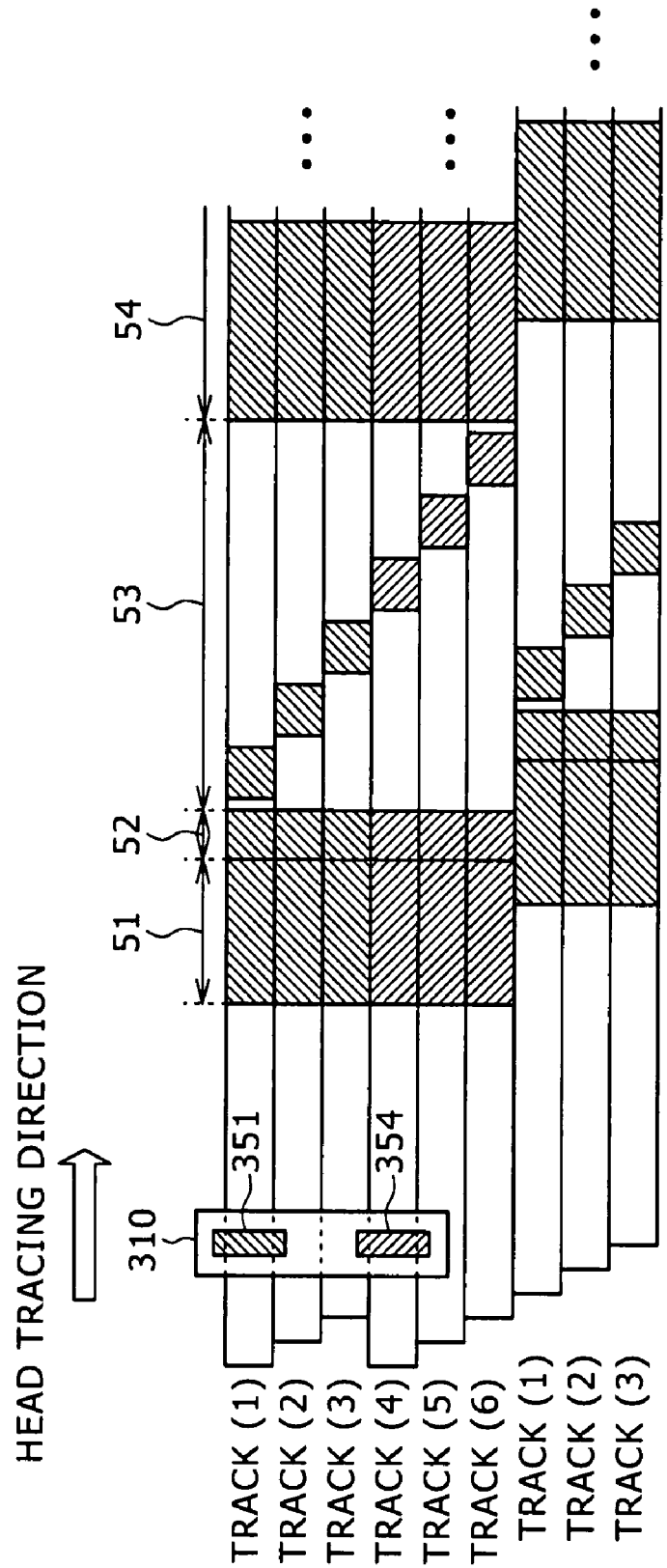

MAGNETIC RECORDING AND REPRODUCING APPARATUS AND MAGNETIC RECORDING AND REPRODUCING METHOD

CROSS REFERENCES TO RELATED APPLICATIONS

The present invention contains subject matter related to Japanese Patent Application JP 2006-111899 filed with the Japan Patent Office on Apr. 14, 2006, the entire contents of which being incorporated herein by reference.

BACKGROUND OF THE INVENTION

1. Field of the Invention

The present invention relates to a magnetic recording and reproducing apparatus and a magnetic recording and reproducing method for causing one or a plurality of write heads to record a plurality of tracks to a piece of magnetic recording media and one or a plurality of read heads to reproduce signals from these tracks.

2. Description of the Related Art

In recent years, efforts have been made to bring about higher recording densities to achieve greater capacities of magnetic recording media using magnetic heads suitable for narrowing the widths of tracks on pieces of the media. Generally, the key to the successful narrowing of tracks is how to improve the accuracy of the tracking servo in use.

As the widths of tracks have been narrowed, it has become increasingly difficult for the servo facility of magnetic tape recording and reproducing apparatuses to progress in accuracy. One proposed solution to that difficulty is the so-called non-tracking system that is now in actual use (e.g., see Japanese Patents Nos. 1842057, 1842058, and 1842059; and Japanese Patents Laid-open Nos. Hei 04-370580 and Hei 05-020788). The non-tracking system involves having data recorded in blocks for identification purposes to tracks that are recorded by helical scan with a double azimuth head arrangement. Even if data is not reproduced from the target track by a single trace, the system allows the data to be reconstituted later. The non-tracking system provides at least four times as much margin for tracking control within a single track as traditional tracking servo systems require.

The non-tracking technique has been considered for possible use in linear recording in addition to helical scan (e.g., see Japanese Patents Laid-open Nos. Hei 10-283620 and 2003-132504).

Where the substrate for magnetic recording media is an elastic nonmagnetic support such as polyester film, the allowable amount of deformation in the substrate is typically up to about twice the track width applicable to double azimuth recording in combination with a tracking servo. A larger amount of deformation than that would make it impossible to reproduce signals with a high enough S/N ratio from the media. For recording without recourse to the double azimuth feature, each of so-called guard bands separating tracks is required in size to be no greater than the amount of deformation in the tape in combined use with the tracking servo. The requirement needs to be met to prevent degradation of reliability in such factors as error rate.

The problem above is attributable to the fact that typical signal reproduction systems so far have left their signal quality to deteriorate considerably while using at least one read head to read signals concurrently from a plurality of tracks. The bottleneck has been bypassed traditionally by providing guard bands in conjunction with the double azimuth arrangement and by getting the read head to read signals from one track only.

However, provision of guard bands is an impediment to higher track densities. Moreover, double azimuth recording, which is supposed to minimize interference between adjacent tracks during reproduction, tends to lose its effectiveness when the tracks are arranged to be narrowed.

The same applies to the non-tracking system as well. That is, although signals are apparently reproduced by the read head concurrently from a plurality of tracks, the read head in fact reproduces the data always from a single track from a time-shared point of view. Signals are never reproduced simultaneously from a plurality of tracks.

Where non-tracking systems are designed to address ever-higher track densities, they tend to suffer from noise stemming from signals picked up from tracks adjacent to the target track. Apparently, there exists a limit to how much narrower the tracks can be arranged to be.

In a proposed technique belonging to the related art of magnetic head devices, a plurality of magnetic recording layers or magnetic read head layers each having the same magnetic head element are stacked on the substrate composed of a nonmagnetic material. All magnetic head elements are then shifted in a direction substantially perpendicular to the stacking direction (the perpendicular direction is called the head width direction). This arrangement is disclosed illustratively in Japanese Patents Laid-open Nos. 2002-216313 and 2002-157710.

In another development aimed at boosting recording density, there is proposed a technique for recording a plurality of data frames concurrently using a plurality of heads forming a single block of the same azimuth (e.g., see Japanese Patents Laid-open Nos. 2003-338012 and 2004-071014).

The proposed techniques outlined above involve narrowing the read head width to about half the track width. This constitutes restrictions on attempts to increase the output of reproduction signals. Illustratively, a sufficiently high S/N ratio is difficult to sustain with these techniques. Overall, these techniques are not necessarily suitable for attaining ever-higher recording densities.

Meanwhile, MIMO (multi-input/multi-output) technology is a well-known technology for use in wireless communications (e.g., see Japanese Patent No. 3664993).

Also known are techniques for applying MIMO technology to magnetic recording (e.g., see IEEE Paper Trans. Mag. Vol. 30, No. 6; November 1994, page 5100). However, there are problems yet to be cleared before commercialization, including how to employ a read head wider than a recorded track.

The present invention proposes techniques which are designed to apply MIMO technology to magnetic recording and which were not anticipated from the related art including the above-cited paper.

SUMMARY OF THE INVENTION

As described, typical magnetic recording and reproducing systems have adopted the scheme of narrowing the track width on magnetic recording media in an attempt to boost recording density. However, too much narrowing of the track width in pursuit of higher recording density has resulted in the inability to follow tracks during reproduction. One proposed solution to that bottleneck is the non-tracking system involving the use of a read head capable of reading signals from tracks not strictly in alignment with the head. This system, however, is subject to severe constraints on how to set up the read head in order to obtain reproduction signals correctly. In this respect, there also seems to be a limit to narrowing the track width for attaining higher recording density.

The inventors of the present invention developed techniques for implementing a multi-track magnetic recording and reproducing apparatus capable of narrowing the track width for higher recording density while easing constraints on determining the width of the read head.

There were some problems to be resolved before such a magnetic recording and reproducing apparatus could be implemented. One such problem was the tendency of reproduction signals decreasing in their amplitude due to phase misalignment between signals from adjacent tracks.

The present invention has been made in view of the above circumstances and provides a multi-track magnetic recording and reproducing apparatus and a magnetic recording and reproducing method capable of narrowing the track width for higher recording density and resolving the problem of reproduction signals diminishing in their amplitude due to phase misalignment between adjacent track signals.

In carrying out the present invention and according to one embodiment thereof, there is provided a magnetic recording and reproducing apparatus including: a recording device configured to record with a write head a plurality of tracks constituting a unit of signal processing for data detection, to magnetic recording media; a reproduction device configured to reproduce with a read head a plurality of reproduction signals concurrently from the plurality of tracks on the magnetic recording media in different positional relations to the tracks, the reproduction signals being arranged into that one unit for signal processing thereby generating the track-specific reproduction signals; and a phase alignment device configured to align phases of record signals between adjacent tracks among the plurality of tracks recorded by the recording device to the magnetic recording media.

According to the magnetic recording and reproducing apparatus above of this invention, the record signals between adjacent tracks among the plurality of tracks recorded by the recording device to the magnetic recording media are aligned in phase. Where the apparatus is implemented with a view to narrowing the track width for higher recording density, this feature contributes significantly to eliminating the problem of reproduction signals diminishing in their amplitude because of phase misalignment between adjacent track signals.

Preferably, the phase alignment device may record the same learning signal to each of the adjacent tracks and, based on the reproduction signals reproduced by the reproduction device, determine an optimum delay for the signal to be recorded to one of the adjacent tracks relative to the signal to be recorded to the other one of the adjacent tracks. The same learning signal may preferably be a repetitive signal of a single frequency.

Preferably, the phase alignment device may determine the optimum delay based on an amplitude value of the reproduced signals.

Preferably, the phase alignment device may determine the optimum delay in an increasingly accurate manner through a plurality of steps. Alternatively, the phase alignment device may determine the optimum delay using what is known as the steepest descent method.

According to the present invention, as outlined above, a multi-track magnetic recording and reproducing apparatus is implemented in a manner narrowing the track width for higher recording density while eliminating the problem of the decreasing amplitude of reproduction signals due to phase misalignment between adjacent tracks signals.

BRIEF DESCRIPTION OF THE DRAWINGS

FIGS. 4A and 4B are schematic views making comparisons of write head patterns, media recording patterns, and read head patterns between the typical linear system in use and the embodiment of the invention;

FIG. 8 is a schematic view showing phase relations between a plurality of track signals to be recorded adjacent to each other on magnetic recording media;

FIG. 19 is a flowchart of steps constituting a reading process performed by the magnetic recording and reproducing apparatus of FIG. 16;

FIG. 29 is a conceptual view showing units of tracks to be recorded to magnetic recording media by the double azimuth helical scan method having a single write head furnished per azimuth angle; and FIG. 30 is a schematic view showing separation patterns to be recorded to the tracks in FIG. 29.

DETAILED DESCRIPTION OF THE PREFERRED EMBODIMENTS

Preferred embodiments of the present invention will now be described in detail with reference to the accompanying drawings.

First Embodiment

Figure 1:
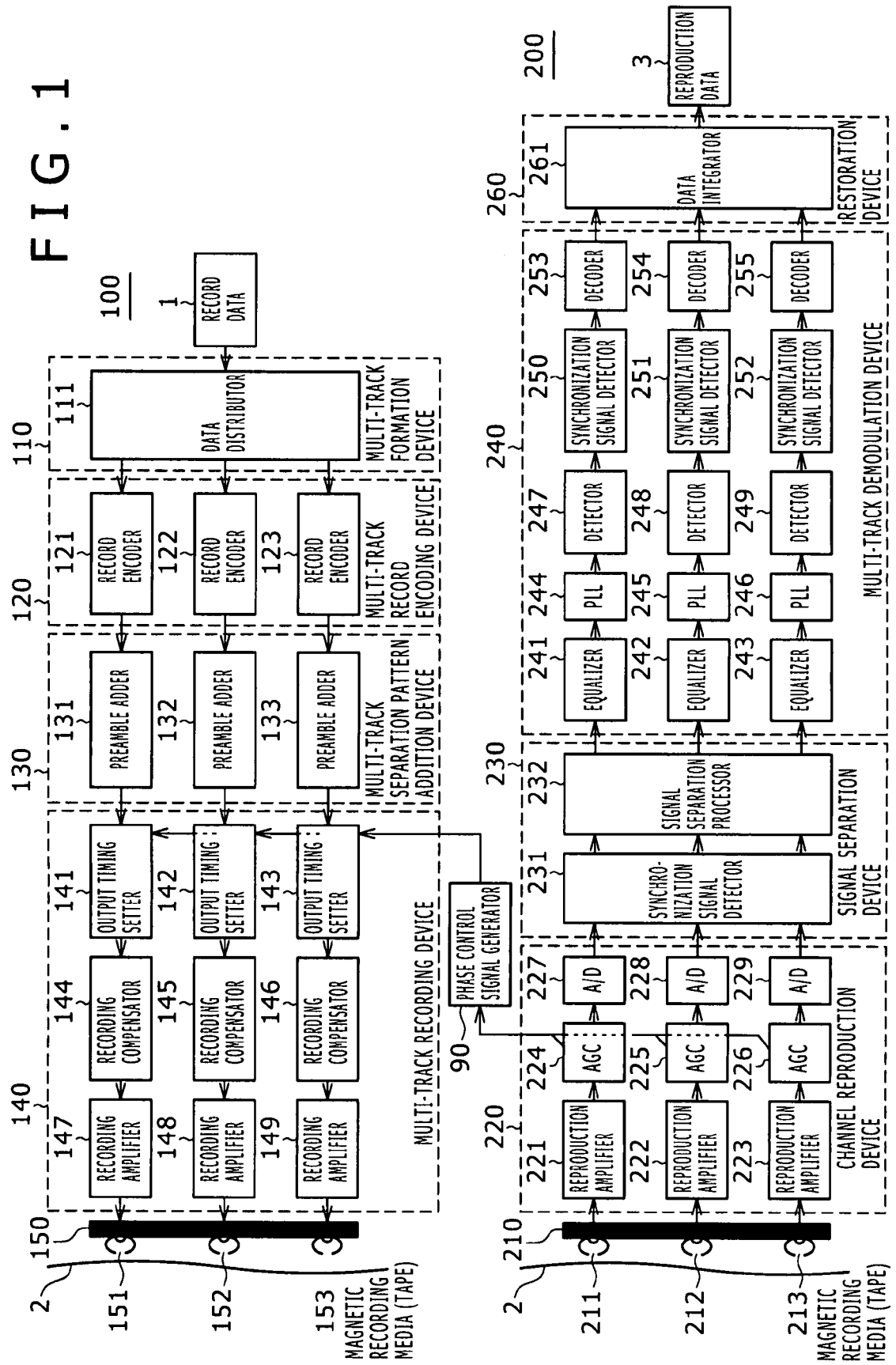
FIG. 1 is a block diagram showing typical structures of a recording device and a reproduction device constituting a multi-head multi-track magnetic recording and reproducing apparatus practiced as one embodiment of the present invention.

FIG. 1 is a block diagram showing typical structures of a multi-head multi-track magnetic recording and reproducing apparatus practiced as one embodiment of the present invention. If the number of write heads is assumed to be represented by M and the number of read heads by N, then this is an example in which M=3 and N=3. As shown in FIG. 1, the magnetic recording and reproducing apparatus has a recording device 100 and a reproduction device 200.

The recording device 100 is made up of a multi-track formation device 110, a multi-track record encoding device 120, a multi-track separation pattern addition device 130, a multi-track recording device 140, and a write head array 150.

The multi-track formation device 110 is composed of a data distributor 111 that distributes record data 1 into three data portions corresponding to the write heads 151, 152 and 153 (M=3) mounted on the write head array 150 for multi-track formation purposes. The multi-track record encoding device 120 is constituted by as many as M record encoders 121, 122 and 123 for encoding the record data distributed by the data distributor 111. The multi-track separation pattern addition device 130 is made of M preamble adders 131, 132 and 133 for adding preambles to the encoded record data. The multi-track recording device 140 is constituted by M output timing setters 141, 142 and 143 for providing suitable timings to the preamble-furnished record data; by M recording compensators 144, 145 and 146 for performing recording compensation; and by M recording amplifiers 147, 148 and 149 for driving the individual write heads 151, 152 and 153 on the basis of recording-compensated record data.

The reproduction device 200 includes a read head array 210, a channel reproduction device 220, a signal separation device 230, a multi-track demodulation device 240, and a restoration device 260.

The read head array 210 has as many as N (e.g., 3) read heads 211, 212 and 213 for reading signals from the tracks recorded on magnetic recording media 2.

The channel reproduction device 220 is constituted by N (e.g., 3) reproduction amplifiers 221, 222 and 223 for amplifying the signals reproduced by the N read heads 211, 212 and 213 on the read head array 210; by AGCs (automatic gain control) 224, 225 and 226 for controlling gains to let the amplitude levels output by the N reproduction amplifiers 221, 222 and 223 attain predetermined values; and by A/D converts 227, 228 and 229 for quantizing the outputs from the AGCs 224, 225 and 226 into digital values of a predetermined bit width each. If needed, low-pass filters may be furnished immediately upstream of the A/D converters 227, 228 and 229 to remove unnecessary high-pass components.

The signal separation device 230 includes a synchronization signal detector 231 and a signal separation processor 232 furnished downstream of the detector 231. The synchronization signal detector 231 detects synchronization signals from the outputs of the A/D converters 227, 228 and 229, the signals denoting the positions from which the separation patterns start. Based on the synchronization signals detected by the synchronization signal detector 231, the signal separation processor 232 determines the separation pattern starting positions. Using the separation patterns thus determined, the signal separation processor 232 performs channel estimation and signal separation computations so as to separate track-specific reproduction signals out of the reproduction signals which make up a single unit and which are reproduced by a plurality of read heads 211, 212 and 213.

The multi-track demodulation device 240 is constituted by as many as M equalizers 241, 242 and 243 for equalizing the reproduction signals separated by track; by M PLLs (phase-locked loop) 244, 245 and 246 for performing bit synchronization on the outputs from the equalizers 241, 242 and 243; by M detectors 247, 248 and 249 for binarizing the track-specific reproduction signals into code word sequences; by M synchronization signal detectors 250, 251 and 252 which are located downstream of the detectors 247, 248 and 249 and which detect synchronization signals in the code word sequences from the binarized reproduction signals output by the detectors 247, 248 and 249; and by M decoders which determine the starting positions of data areas using synchronization signals detected by the upstream synchronization signal detectors 250, 251 and 252, before decoding the data.

The restoration device 260 is composed of a data integrator 261 that restores reproduction data 3 by connecting the data from the different tracks output by the M decoders 253, 254 and 255, through reversing of the steps in which the data was initially recorded.

The structures of the recording device 100 and reproduction device 200 were described above. The magnetic recording and reproducing apparatus of this embodiment also includes a phase control signal generator 90 that forwards phase information from the reproduction device 200 to the recording device 100. The phase control signal generator 90 is capable of effecting control in such a manner as to align phases of record signals between adjacent tracks among a plurality of tracks to be recorded to the magnetic recording media 2.

What follows is a description of basic recording and reproduction processing carried out by the magnetic recording and reproducing apparatus of this embodiment.

Figure 2:
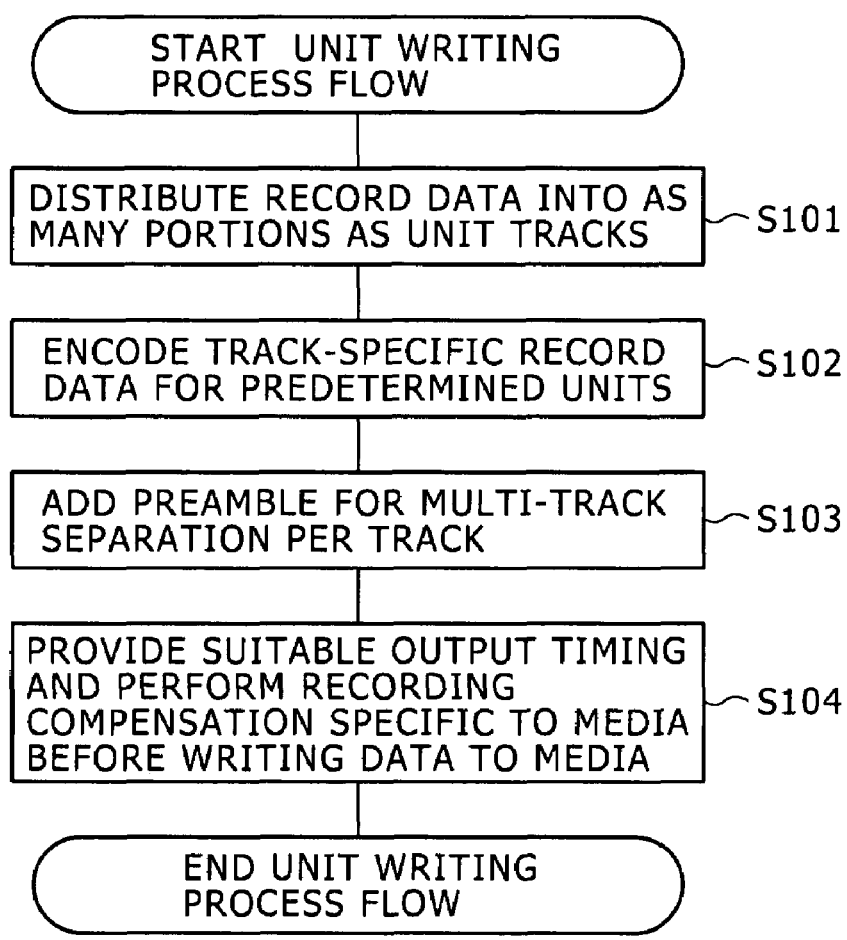
FIG. 2 is a flowchart of steps constituting a writing process performed by the magnetic recording and reproducing apparatus of FIG. 1.

The basic process of recording is the first to be discussed. FIG. 2 is a flowchart of steps constituting a writing process performed by the embodiment. In step S101, the multi-track formation device 110 of the recording device 100 distributes input record data 1 into as many data portions as the number of write heads 151, 152 and 153 (M=3)(i.e., track-specific data). In step S102, the distributed data portions are encoded by the record encoders 121, 122 and 123 of the multi-track record encoding device 120 into code word sequences, with the recording and reproduction characteristics of the magnetic recording media 2 taken into consideration. At this point, the code word sequences are each furnished with information necessary for data demodulation such as synchronization signals.

In step S103, the preamble adders 131, 132 and 133 of the multi-track separation pattern addition device 130 add preamble codes to predetermined positions of the generated code word sequences, whereby encoded record sequences are generated. The preamble code makes up separation patterns used to separate the reproduction signals read by the read heads into track-specific signals through suitable signal processing. The separation patterns are generated by taking into consideration the rules applicable to the code word sequences generated by the record encoders 121, 122 and 123 of the multi-track record encoding device 120.

In step S104, the track-specific encoded record sequences are given suitable timings by the output timing setters 141, 142 and 143 of the multi-track recording device 140 and are recording-compensated by the recording compensators 144, 145 and 146 for optimized recording to the magnetic recording media 2. Thereafter, the track-specific encoded record sequences are converted by the recording amplifiers 147, 148 and 149 from voltages to currents. The converted currents are sent to the write heads 151, 152 and 153 for recording to the magnetic recording media 2.

Figure 3:
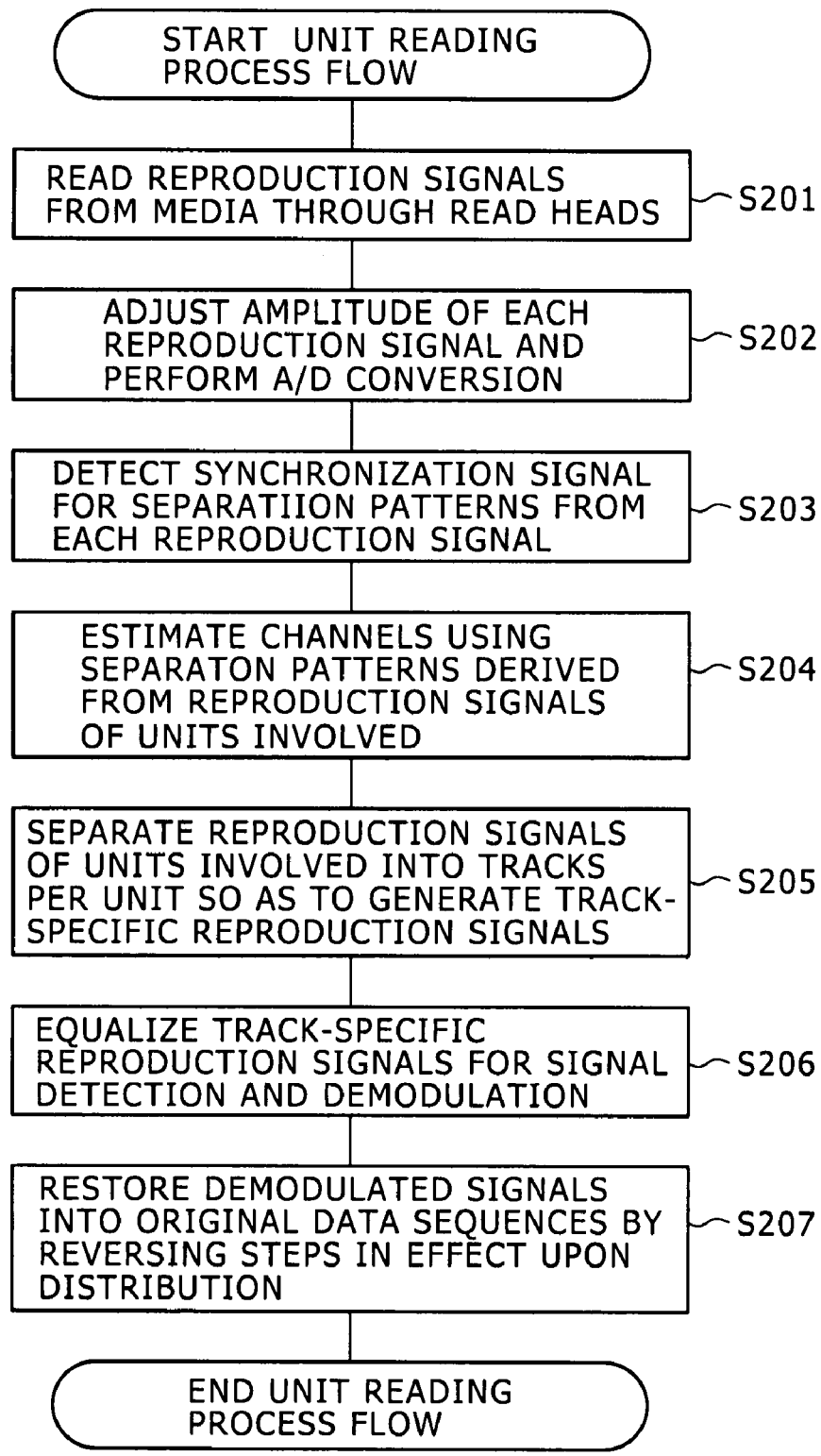
FIG. 3 is a flowchart of steps constituting a reading process performed by the magnetic recording and reproducing apparatus of FIG. 1.

The basic process of reproduction will now be described. FIG. 3 is a flowchart of steps constituting a reading process performed by this embodiment.

In step S201, as many as N (e.g., 3) read heads 211, 212 and 213 of the reproduction device 200 reproduce signals from the tracks on the magnetic recording media 2. In step S202, the AGCs 224, 225 and 226 adjust the amplitude levels of the outputs from the reproduction amplifiers 221, 222 and 223. The outputs of the AGCs are then converted to digital values by the A/D converters 227, 228 and 229 for output to the synchronization signal detector 231. In step S203, the synchronization signal detector 231 detects synchronization signals from the outputs of the A/D converters 227, 228 and 229 to determine the starting positions of separation patterns. In step S204, based on the synchronization signals thus detected, the signal separation processor 232 determines the separation pattern starting positions in the reproduction signals. Using the separation patterns thus determined, the signal separation processor 232 performs channel estimation computations. In step S205, the signal separation processor 232 generates track-specific reproduction signals out of the reproduction signals constituting a single unit through the use of the result of the channel estimation computations.

Thereafter in step S206, the reproduction signals separated track by track are equalized by the equalizers 241, 242 and 243 of the multi-track demodulation device 240 and are subjected to bit synchronization through the PLLs 244, 245 and 246 before the track-specific reproduction signals are binarized by the detectors 247, 248 and 249, whereby track-specific code word sequences are generated. The synchronization signal detectors 250, 251 and 252 located downstream detect synchronization signals from the track-specific code word sequences. The synchronization signals derived from the track-specific code word sequences past the detectors 253, 254 and 255 are used to decode the data sequences. The resulting track-specific data portions are combined by the restoration device 260 into the reproduction data.

What follows is a description of how the recording and read heads are structured in the case of the magnetic recording and reproducing apparatus of this embodiment. The description will be made through comparisons with the structures of typical recording and read heads currently in use.

FIG. 4A shows write head patterns, media recording patterns, and read head patterns typical of the traditional linear method. It is assumed that the write head width indicated by Tw is the same on all write heads and that the read head width represented by Tr is the same on all read heads. The distance between track centers of adjacent write heads is assumed to be denoted by Dt. It is also assumed that magnetization direction (i.e., azimuth angle) is the same on all tracks.

With the traditional setup, as shown in FIG. 4A, the distance Dt is greater than the write head width Tw because the write heads are laid out in a manner separated from one another in the track width direction. The read head width Tr is set to be smaller than the write head width Tw, i.e., the width of a pattern recorded on media. A signal is obtained only from a single track.

To build a plurality of write heads into a single module of the write head array 150 typically requires furnishing gaps between the heads. When the multiple write heads are arrayed serially in the track width direction as shown in FIG. 4A, the distance Dt is made greater than the write head width Tw. The read head width Tr, smaller than the write head width Tw, is then set to be still shorter than the distance Dt.

As described above, it was typically difficult to enlarge the read head width Tr in order to read signals separately from each of the tracks. If the write head width Tw was reduced to attain higher recording density or if the signals to be written to the media were to be recorded in a manner partially overlapping with one another in the track width direction, then the read head width Tr would have to be made still smaller. These constraints hampered hardware implementation and tended to degrade reproduction characteristics.

FIG. 4B shows write head patterns, media recording patterns, and read head patterns typical of this embodiment. As shown in FIG. 4B, the write heads are positioned with a predetermined gap furnished between adjacent heads in the media traveling direction and in such a manner that parts of the tracks written by adjacent write heads overlap in the track width direction. That is, since the distance Dt is made smaller than the write head width Tw, the media recording patterns of two adjacent tracks partially overlap with each other in the track width direction. With the write heads staggered in the traveling direction of magnetic recording media, one of the two media recording patterns which was written earlier by one write head is partially overwritten with the other pattern recorded later by the other write head.

As with the write heads, the read reads are staggered in the traveling direction of magnetic recording media. Unlike in the traditional setup, the read head width Tr need not be made smaller than the write head width Tw. Illustratively, the read head width Tr may be equal to or greater than the write head width Tw. Reproduction signals obtained by individual read heads are each allowed to include signals from adjacent tracks. That is because the reproduction signals read concurrently from a plurality of tracks can be separated into track-specific reproduction signals through appropriate signal processing, as will be discussed later in detail.

Because the read head width Tr is set to be larger than usual, this embodiment permits recording and reproduction with enhanced reproduction characteristics. With the track-to-track distance Dt set to be smaller than the read head width Tr, track density can be made higher than before.

Described below are the devices configured to separate the reproduction signals obtained concurrently from a plurality of tracks by a plurality of read heads into track-specific reproduction signals.

Figure 5:
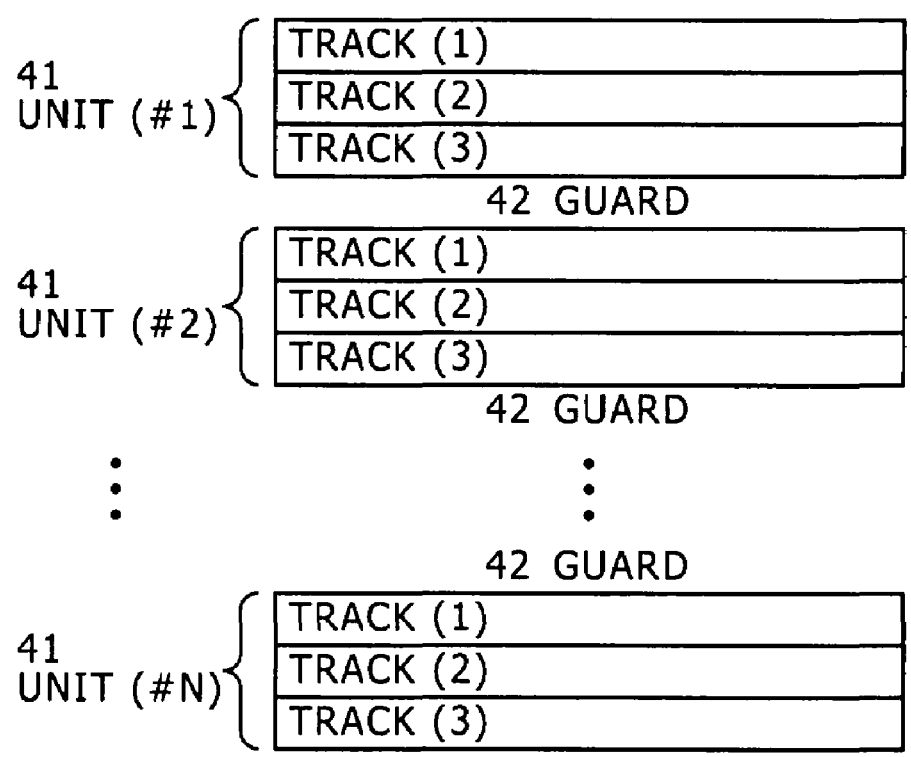
FIG. 5 is a conceptual view showing one unit of tracks to be recorded to magnetic recording media.

FIG. 5 is a conceptual view showing one unit of tracks to be recorded to magnetic recording media.

It is assumed that as many as M tracks recorded by M write heads onto magnetic recording media are called a unit. Tracks (1), (2) and (3) are shown recorded to the magnetic recording media respectively by M write heads 151, 152 and 153 of the recording device 100. The tracks (1), (2) and (3) are collectively called a unit 41. A blank area called a guard 42 is provided between units, e.g., between a first unit (#1) and a second unit (#2). The purpose of the guard 42 is to ensure that the track of any adjacent unit is not reproduced simultaneously.

Figure 6:
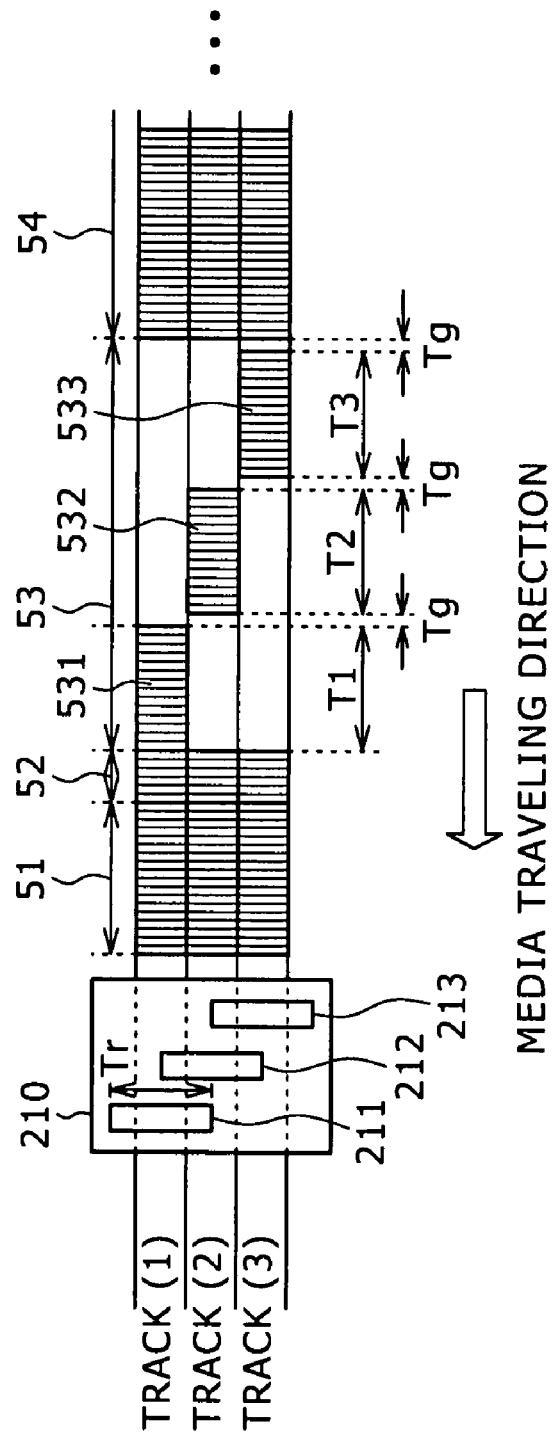
FIG. 6 is a schematic view showing typical separation patterns to be recorded to magnetic recording media.

FIG. 6 is a schematic view showing typical separation patterns to be recorded to magnetic recording media.

As shown in FIG. 6, patterns necessary for separating the signals read concurrently from a plurality of tracks by the read heads 211, 212 and 213 into track-specific signals are constituted by a first preamble 51, a SYNC 52, and a second preamble 53 recorded in that order. The second preamble 53 is followed by data 54. The data 54 is made up of encoded record sequences generated at the time of recording by the record encoders 121, 122 and 123 of the recording device 100 shown in FIG. 1. The first preamble 51, SYNC 52, and second preamble 53 are added by the preamble adders 131, 132 and 133 respectively.

At the time of reproduction, the first preamble 51 is used primarily by the AGCs 22, 225 and 226 as a learning signal for gain control of the reproduction amplifiers 221, 222 and 223 in the reproduction device 200 shown in FIG. 1. The first preamble 51 may also be used for the learning of bit synchronization detection as needed. The SYNC 52 is used by the upstream synchronization signal detector 231 as a synchronization signal for determining the starting position of the second preamble 53. The second preamble 53 is used by the signal separation processor 232 for signal processing whereby the signals reproduced concurrently from a plurality of tracks by a plurality of read heads are separated into track-specific reproduction signals. The data 54 is used by the components making up the multi-track demodulation device 240.

In the second preamble 53, signals 531, 532 and 533 specific to the tracks are recorded in a manner not physically overlapping with one another. As shown in FIG. 6, the signals 531, 532 and 533 are recorded to segments T1, T2 and T3 corresponding to the tracks (1), (2) and (3) respectively. Thus there are three separation patterns reflecting the number of tracks involved. In the second preamble 53, predetermined temporal gaps Tg are furnished between the signals 531, 532 and 533 from the adjacent tracks so that these signals will not overlap temporally with one another.

The separation patterns are each recorded using a minimum recording wavelength or a higher, predetermined wavelength.

The signal separation processor 232 performs channel estimation computations using reproduction signals of the separation patterns. Through the computations, the signal separation processor 232 generates channel estimation information needed subsequently to separate the signals into track-specific reproduction signals. The channel estimation information corresponds to position information about the individual read heads 211, 212 and 213 in the track width direction with regard to one unit of tracks. That is, the channel estimation information indicates in what manner the individual read heads 211, 212 and 213 overlap positionally with the tracks within each unit.

The signal separation processor 232 proceeds to carry out signal separation computations based on the generated channel estimation information and on the reproduction signals read by the read heads 211, 212 and 213. Through the computations, the signal separation processor 232 separates the signals reproduced concurrently from the tracks by the read heads 211, 212 and 213 into track-specific signals.

In the example of FIG. 6, the head width Tr for each of the read heads 211, 212 and 213 is set to be 1.5 times the write track width. Each of the read heads 211, 212 and 213 is arranged to read signals from a plurality of tracks. In this case, the read head 211 reads signals concurrently from the tracks (1) and (2); the read head 212 from the three tracks (1), (2) and (3); and the read head 213 from the tracks (2) and (3).

Then through the signal separation process, the signal of the track (1) is generated from the signals reproduced by the read heads 211 and 212; the signal of the track (2) is generated from the signals reproduced by the read heads 211, 212 and 213; and the signal of the track (3) is generated from the signals reproduced by the head heads 212 and 213.

Particularly noteworthy is the fact that the signal of the track (2) is generated from the three signals reproduced from three staggered track positions. Compared with the usual recording and reproducing apparatus having one track reproduced by a single read head, this inventive arrangement affords a greater margin of tolerable displacements to the read heads ensuring good signal reproduction in relation to the tracks.

In the example of FIG. 5, the guards 42 are shown furnished between the units 41 to prevent signals from getting reproduced inadvertently from adjacent units 41. Alternatively, the guards 42 may be removed when this embodiment is implemented. That is, the units may be laid out in a manner minimizing gaps therebetween in the track width direction.

There are other methods for keeping signals from being reproduced from tracks of adjacent units. One such method may involve setting the widths of write heads in such a manner that each of two outermost tracks among a plurality of tracks becomes wider than each of the other tracks and making the width of each read head smaller than that of the write head corresponding to each of the two outermost tracks. Another method may involve giving the same width to all tracks and causing the width of each of the read heads corresponding to the two outermost tracks of each unit to be smaller than the width of the other read heads.

Where the position information about the read heads relative to each unit is to be obtained, tracking servo information may be utilized in place of the above-described separation patterns. In this case, tracking servo information defines positional relations between the recording patterns in each unit on the one hand, and the read heads involved on the other hand. The positional relations are organized on a unit-by-unit basis into channel estimation information. In like manner, track-specific signals are separated through appropriate signal separation computations based on the generated channel estimation information and on the signals reproduced by the read heads.

As another alternative, the setup of acquiring the position information about the read heads using separation patterns need not be used independently of the setup of obtaining the read head position information based on tracking servo information. The two setups may be utilized in combination.

Figure 7:
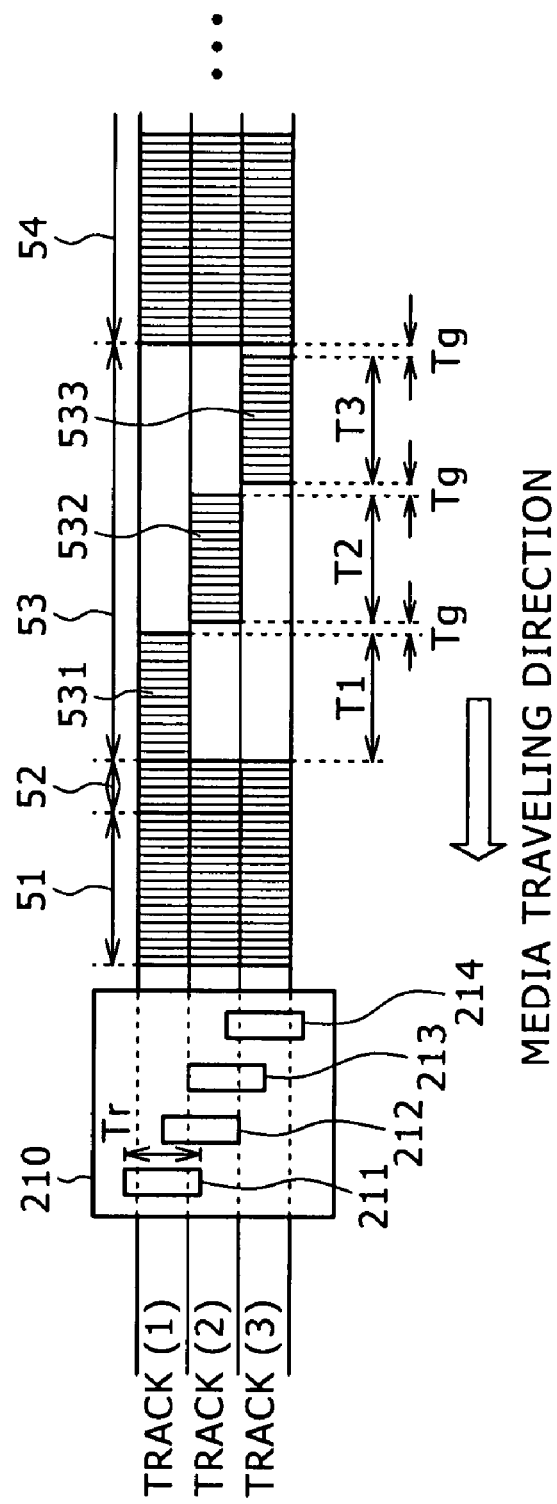
FIG. 7 is a schematic view giving a variation of what is shown in FIG. 6, with three write heads (tracks) and four read heads.

FIG. 7 is a schematic view giving a variation of what is shown in FIG. 6, with three write heads and four read heads.

It is assumed that read heads 211, 212, 213 and 214 each have a head width Tr greater than that of each write head, not shown. The read head 211 reads signals concurrently from tracks (1) and (2) and so does the read head 212 from the same tracks. The read head 213 reads signals concurrently from tracks (2) and (3), and so does the read head 214 from the same tracks.

Then through the signal separation process, the signal of the track (1) is generated from the signals reproduced by the read heads 211 and 212; the signal of the track (2) is generated from the signals reproduced by the read heads 211, 212, 213 and 214; and the signal of the track (3) is generated from the signals reproduced by the head heads 213 and 214.

Particularly noteworthy is the fact that the signal of the track (2) is generated from the four signals reproduced from four staggered track positions. Compared with the usual recording and reproducing apparatus having one track reproduced by a single read head, this inventive arrangement also affords a greater margin of tolerable displacements to the read heads ensuring good signal reproduction in relation to the tracks.

As in the example of FIG. 5, the guards 42 of this example may be furnished between the units to prevent signals from getting reproduced inadvertently from an adjacent unit.

In the preceding setup where there are more read heads than write heads, the signal separation processor 232 also generates channel estimation information using the reproduction signals of separation patterns. The signal separation processor 232 proceeds to perform signal separation computations based on the generated channel estimation information and on data information read by the read heads 211, 212, 213 and 214, whereby the signals reproduced concurrently from a plurality of tracks by the read heads are separated into track-specific signals.

Described below are examples of channel estimation and signal separation computations carried out by the signal separation processor 232.

It is assumed that the original data vector recorded by each write head to predetermined sampling positions "k" is defined as $$X(k) = [x1(k)\, x2(k)\, x3(k)]^T \quad (1)$$

where, T stands for transposition. It is also assumed that the reproduction signals read by each read head from a plurality of tracks are defined by the following expression:

$$Y(k) = [y1(k)\, y2(k)\, y3(k)]^T \quad (2)$$

The relationship between the reproduction signal read by each read head on the one hand and corresponding record data on the other hand is defined by a matrix with N rows and M columns (3 rows, 3 columns in this case). In this respect, the relationship between the expressions (1) and (2) above is defined by the following expression using a matrix H:

$$Y(k) = H \cdot X(k) \quad (3)$$

The expression below is then obtained by applying a generalized inverse matrix to the left part of the expression (3) above:

$$X(k) = H^{-1} \cdot Y(k) \quad (4)$$

The data corresponding to each write head is thus acquired from the reproduction signals.

That is, the signal separation processor 232 first calculates the matrix H of the expression (3) above in the form of channel estimation computations. The signal separation processor 232 then performs signal separation computations involving application of a generalized inverse matrix to the matrix (or simply an inverse matrix if the matrix is a regular square matrix) and calculation of the expression (4) above. In this manner, track-specific reproduction signals are acquired from the signals read concurrently by the read heads from a plurality of tracks.

The matrix H is determined by the number of tracks constituting each unit and by the number of reproduction signals corresponding to the track count. In the example of FIG. 6, the number of tracks per unit (i.e., write head count) is 3 and the number of reproduction signals (read head count) is 3. Thus the matrix H is made up of 3 rows and 3 columns, as defined by the following expression (5):

$$H = \begin{bmatrix} h_{11} & h_{12} & h_{13} \\ h_{21} & h_{22} & h_{23} \\ h_{31} & h_{32} & h_{33} \end{bmatrix} \quad (5)$$

In the example of FIG. 7, the number of tracks per unit (write head count) is 3 and the number of reproduction signals (read head count) is 4. Thus the matrix H is formed by 4 rows and 3 columns, as defined by the following expression (6):

$$H = \begin{bmatrix} h_{11} & h_{12} & h_{13} \\ h_{21} & h_{22} & h_{23} \\ h_{31} & h_{32} & h_{33} \\ h_{41} & h_{42} & h_{43} \end{bmatrix} \quad (6)$$

What follows is a description of how the matrix H is calculated illustratively as channel estimation information.

The matrix H is computed over the stretch of the second preamble 53 shown in FIG. 6, i.e., for the segments T1, T2 and T3 corresponding to the tracks. For the expression (3) above, it is assumed that k=t1 for the segment T1, k=t2 for the segment T2 and k=t3 for the segment T3. It is also assumed that the separation patterns for the tracks in FIG. 5 are the same for simplified data vector representation. In that case, the matrix H is defined as $$\begin{bmatrix} x1(t1) & x1(t2) & x1(t3) \\ x2(t1) & x2(t2) & x2(t3) \\ x3(t1) & x3(t2) & x3(t3) \end{bmatrix} = \begin{bmatrix} 1 & 0 & 0 \\ 0 & 1 & 0 \\ 0 & 0 & 1 \end{bmatrix} \quad (7)$$

For the segment T1, the data vector recorded with k=t1 is given as [1, 0, 0]. Thus:

$$\begin{bmatrix} y1(t1) \\ y2(t1) \\ y3(t1) \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} 1 \\ 0 \\ 0 \end{bmatrix} \quad (8)$$

For the segment T2, the data vector recorded with k=t2 is given as [0, 1, 0]. Thus:

$$\begin{bmatrix} y1(t2) \\ y2(t2) \\ y3(t2) \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} 0 \\ 1 \\ 0 \end{bmatrix} \quad (9)$$

For the segment T3, the data vector recorded with k=t3 is given as [0, 0, 1]. Thus:

$$\begin{bmatrix} y1(t3) \\ y2(t3) \\ y3(t3) \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} 0 \\ 0 \\ 1 \end{bmatrix} \quad (10)$$

From the expressions (8), (9) and (10) above, i.e., using the reproduction signals given when k=t1, k=t2 and k=t3, the matrix H can be defined by another expression (11) as follows:

$$H = \begin{bmatrix} h_{11} & h_{12} & h_{13} \\ h_{21} & h_{22} & h_{23} \\ h_{31} & h_{32} & h_{33} \end{bmatrix} = \begin{bmatrix} y1(t1) & y1(t2) & y1(t3) \\ y2(t1) & y2(t2) & y2(t3) \\ y3(t1) & y3(t2) & y3(t3) \end{bmatrix} \quad (11)$$

The foregoing was the description of how the matrix can be obtained as channel estimation information.

In the above example, the matrix H of the expression (5) was shown computed on the assumption that the setup of FIG. 6 is in effect before being subjected to acquisition of a generalized inverse matrix for computation with the expression (4). Alternatively, if the matrix H of the expression (6) is computed on the assumption that the setup of FIG. 7 is in effect, the generalized inverse matrix may also be acquired in like manner for computation with the expression (4).

In the examples of FIGS. 6 and 7, the types of separation patterns are arranged to correspond with the number of tracks. This arrangement is intended to let a generalized inverse matrix be obtained of the matrix H after the latter has been calculated. Separation patterns other than those defined by the expression (7) include illustratively those given by the expression (12) shown below. Any three separation patterns may be adopted alternatively as long as they are linearly independent of one another.

$$\begin{bmatrix} x1(t1) & x1(t2) & x1(t3) \\ x2(t1) & x2(t2) & x2(t3) \\ x3(t1) & x3(t2) & x3(t3) \end{bmatrix} = \begin{bmatrix} 1 & 0 & 1 \\ 1 & 1 & 0 \\ 0 & 1 & 1 \end{bmatrix} \quad (12)$$

The above-described signal separation computations were shown to acquire the generalized inverse matrix of the matrix defined by the expression (11) for computation with the expression (4). The method of using the expression (4) is commonly known as the zero-forcing method. It should be noted that the signal separation computations are not limited to the method based on the expression (4) above. Alternatively, the so-called MMSE (minimum mean squared error) method may be utilized instead. When the latter method is in use, the expression (4) is replaced by $$X(k) = \frac{H^T}{|H|^2 + \frac{1}{\gamma}} Y(k) \quad (13)$$

where, $\gamma$ stands for the S/N (signal to noise) ratio between signal and noise components.

With this embodiment, as discussed above, the signals reproduced concurrently from a plurality of tracks by the read heads are arranged into units subject to suitable signal processing, whereby track-specific reproduction signals are separated. This makes it possible to render the track-to-track distance within each unit shorter than the width of each read head, whereby enhanced track density is attained.

If the track count is 3 and the read head count is 3 as in the case of FIG. 6, with guards 42 furnished between the units 41 as shown in FIG. 5, then the read head 211 reads signals concurrently from the guard 42 and tracks (1) and (2); the read head 212 from the three tracks (1), (2) and (3); and the read head 213 from the tracks (2) and (3) and the guard 42.

Thus through the signal separation process, the signal of the track (1) is generated from the signals reproduced by the read heads 211 and 212; the signal of the track (2) is generated from the signals reproduced by the read heads 211, 212 and 213; and the signal of the track (3) is generated from the signals reproduced by the read heads 212 and 213.

It will be appreciated that the signal of, say, the track (2) is derived from the three signals reproduced from three staggered track positions. Compared with the usual recording and reproducing apparatus having one track reproduced by a single read head, this inventive arrangement also affords a greater margin of tolerable displacements to the read heads ensuring good signal reproduction in relation to the tracks.

If the track count is 3 and the read head count is 4 as shown in FIG. 7, then the read head 211 reads signals concurrently from the guard 42 and tracks (1) and (2); the read head 212 from the tracks (1), (2) and (3); the read head 213 also from the tracks (1), (2) and (3); and the read head 214 from the tracks (2) and (3) and the guard 42.

Then through the signal separation process, the signal of the track (1) is generated from the signals reproduced by the read heads 211 and 212; the signal of the track (2) is generated from the signals reproduced by the read heads 211, 212, 213 and 214; and the signal of the track (3) is generated from the signals reproduced by the read heads 213 and 214.

The signal of, say, the track (2) is then retrieved from the four signals reproduced from four staggered track positions. Compared with the usual recording and reproducing apparatus having one track reproduced by a single read head, this inventive arrangement also affords a greater margin of tolerable displacements to the read heads ensuring good signal reproduction in relation to the tracks.

Figure 9A:
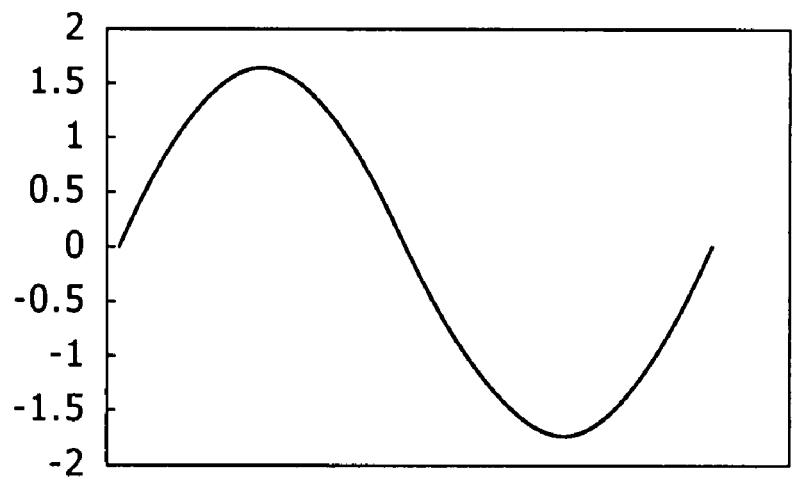
FIGS. 9A and 9B are graphic representations showing correlations between phase misalignment between adjacent track signals on the one hand, and the amplitude of reproduction signals on the other hand.
Figure 9B:
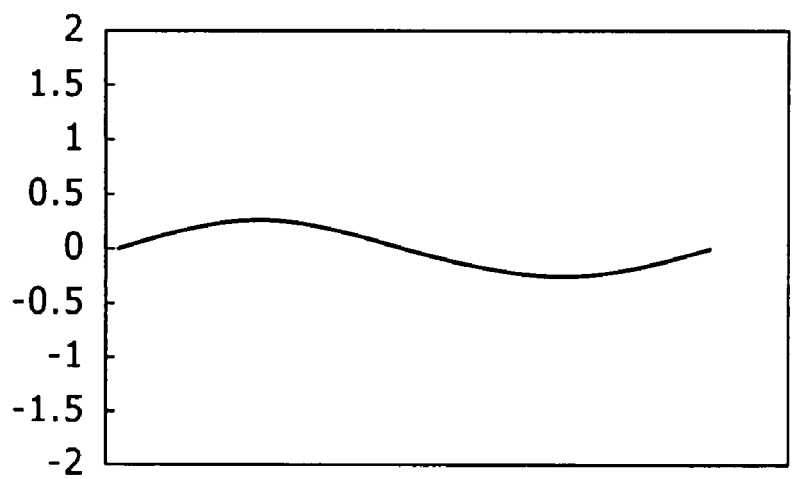

Described below with reference to FIGS. 8 through 9B are phase relations between a plurality of track signals (of a single wavelength) recorded in partially overlapping fashion on magnetic recording media.

In FIG. 8, the read head 211 on the read head array 210 reproduces signals from the track (1) and from the track (2) recorded in partially overlapping relation to the track (1). If the two tracks are in phase with each other as shown in subfigure A of FIG. 8, then the signal reproduced by the read head 211 exhibits maximum amplitude as a result of adding up the signals of the two tracks (1) and (2) as shown in FIG. 9A. If the two tracks are 180 degrees out of phase with each other as shown in subfigure B of FIG. 8, then the signal reproduced by the read head 211 demonstrates reduced amplitude following addition of the signals of the two tracks (1) and (2) as indicated in FIG. 9B.

The drop in reproduced output due to phase misalignment has adverse effects on the first preamble 51 shown in FIG. 6, the preamble being used to set gains for the AGCs 224, 225 and 226 in FIG. 1. As opposed to the case of phases in alignment, the out-of-phase condition may cause inordinately high gains to be set on the AGCs. This may eventually result in the inability to ensure suitable operation ranges. Between adjacent tracks, it is thus necessary to keep the phases of record signals within a predetermined range.

With this embodiment, the output timing setters 141, 142 and 143 of the recording device 100 control the output timings of track-specific record signals in such a manner that the out-of-phase conditions between adjacent track signals are reduced to within a predetermined range. The alignment of phases between adjacent track signals is carried out immediately before the actual recording of user data, or upon shipment from the factory if the procedure is deemed necessary in view of accuracy requirements.

Figure 10:
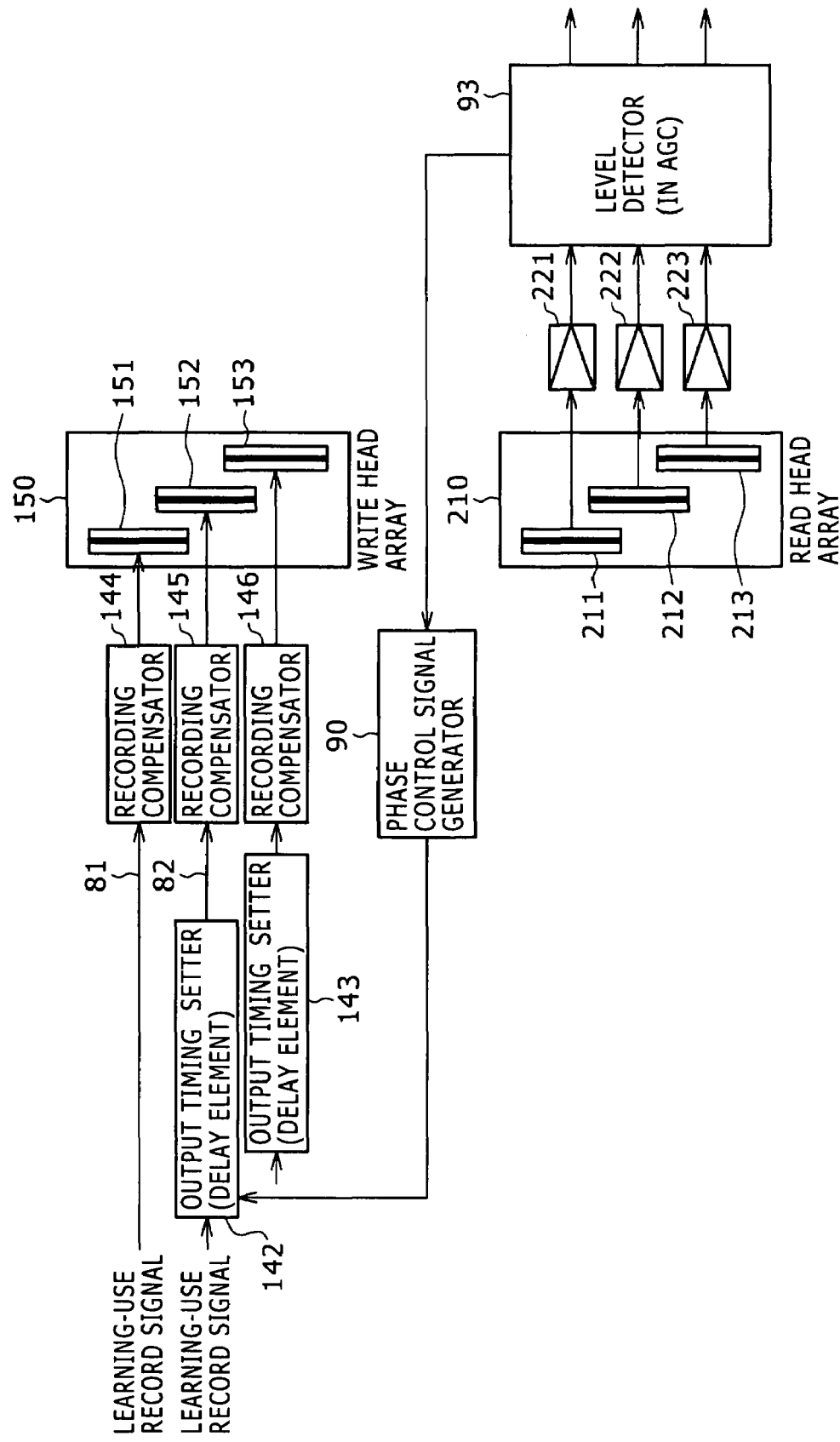
FIG. 10 is a block diagram showing components related to phase alignment between adjacent track signals.

FIG. 10 is a block diagram showing components related to phase alignment between adjacent track signals. FIG. 10 shows only the structure involved with the alignment of phases of the tracks signals to be recorded by the adjacent write heads 151 and 152. Given the output from the level detector 93 in the AGC 224 of the reproduction device 200, the phase control signal generator 90 supplies a control signal to the output timing setter 142 setting the output timing of the record signal to be fed to the write head 152. Illustratively, the output timing setter 142 is composed of a delay element that sets the delay value supplied by the phase control signal generator 90.

What follows is a description of how the phase misalignment between adjacent tracks is reduced illustratively to within $\pi/36$ [rad]. It should be noted that this target is only an example and may be replaced by any other appropriate target to be established to meet specific accuracy requirements of an actually implemented system.

Figure 11:
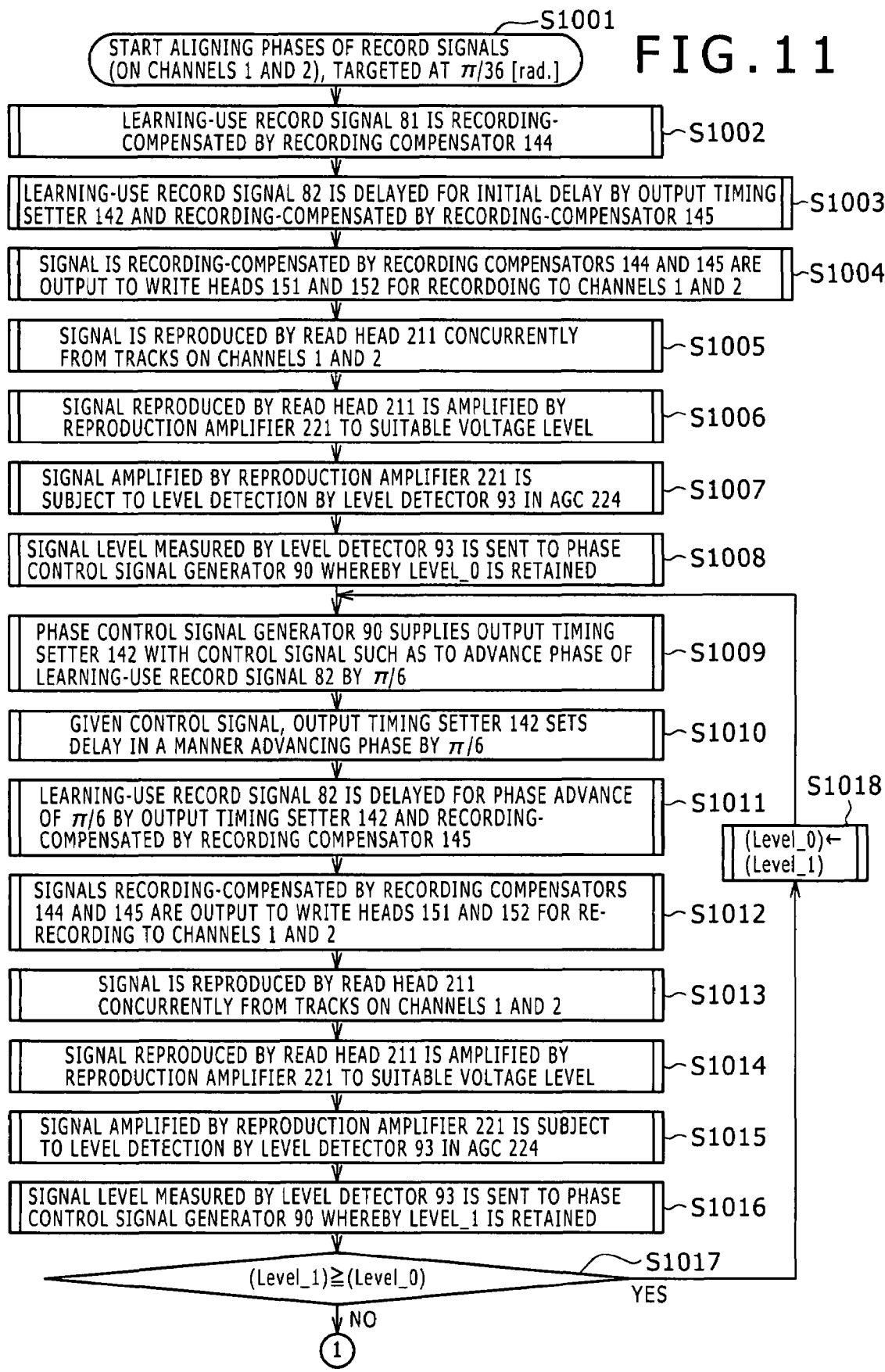
FIG. 11 is a flowchart of steps constituting the process of aligning phases of adjacent track signals.
Figure 12:
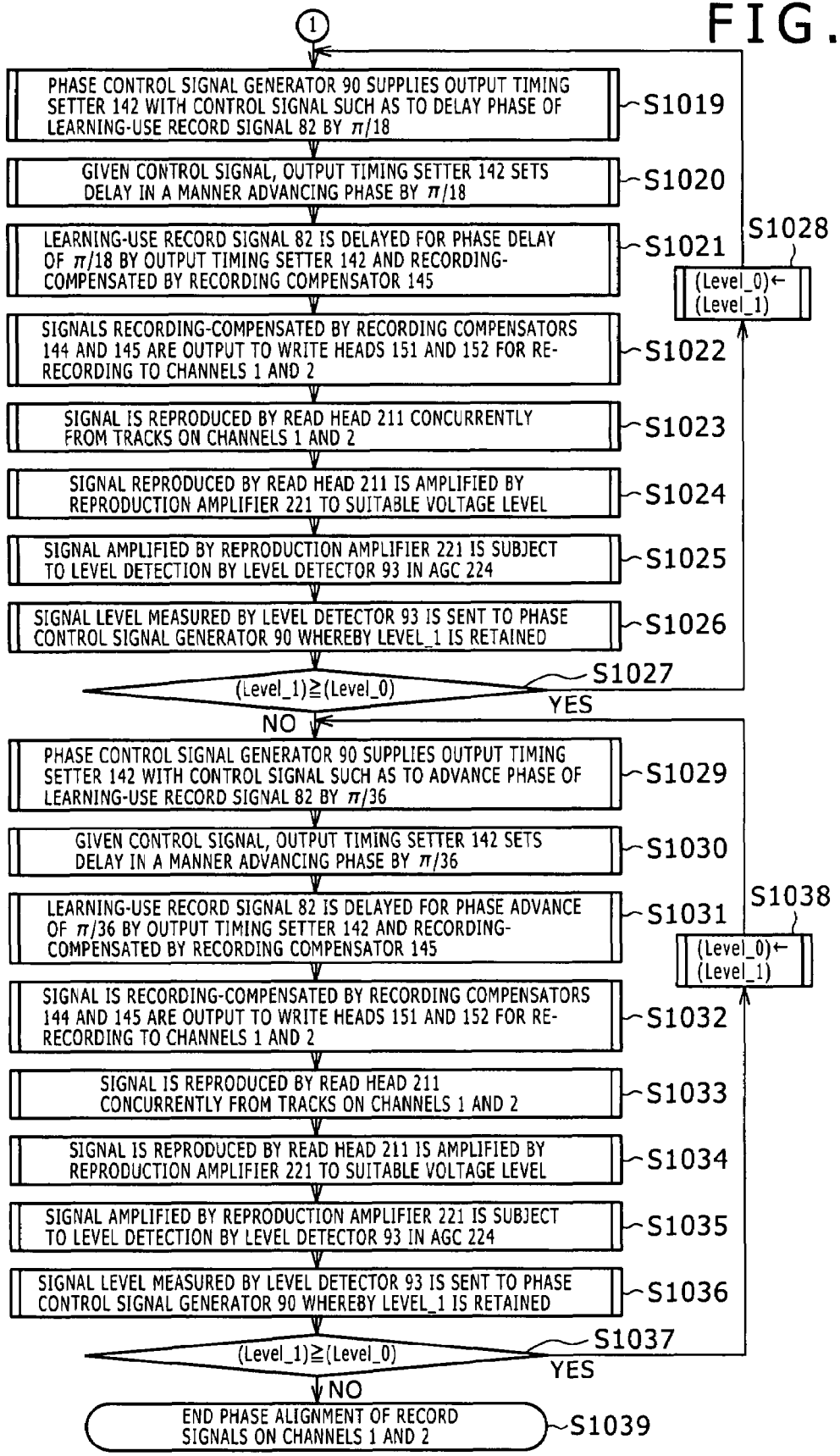
FIG. 12 is a flowchart continued from FIG. 11.

FIG. 11 is a flowchart of steps constituting the process of aligning phases of adjacent track signals, and FIG. 12 is a flowchart continued from FIG. 11.

In step S1001, the process of aligning phases between the track signal (channel 1) to be recorded by the write head 151 and the track signal (channel 2) to be recorded by the write head 152 is started in the setup of FIG. 10.

In step S1002, a learning-use record signal 81 is recording-compensated by the recording compensator 144. In step S1003, a learning-use record signal 82 is delayed for an initial delay by the output timing setter 142 and recording-compensated by the recording compensator 145. In step S1004, the signals recording-compensated by the recording compensators 144 and 145 are output to the write heads 151 and 152 respectively for recording of the two adjacent track signals (channels 1 and 2). The learning-use record signals 81 and 82 are the same signal which is a repetitive signal of a single frequency.

In step S1005, a signal is reproduced by the read head 211 reading the track signals (channels 1 and 2) concurrently from the magnetic recording media 2. In step S1006, the signal reproduced by the read head 211 is amplified to a suitable voltage level by the reproduction amplifier 221. In step S1007, the amplified signal is subjected to signal level detection by the level detector 93 in the AGC 224. In step S1008, the measured signal level is sent to the phase control signal generator 90 whereby the level is retained as Level_0.

In step S1009, the phase control signal generator 90 supplies the output timing setter 142 with a control signal such as to advance the phase of the learning-use record signal 82 by $\pi/6$. In step S1010, given the control signal, the output timing setter 142 sets the delay in a manner advancing the phase by $\pi/6$. In step S1011, the learning-use record signal 82 is delayed for a phase advance of $\pi/6$ by the output timing setter 142 and recording-compensated by the recording compensator 145. In step S1012, the signals recording-compensated by the recording compensators 144 and 145 are output to the write heads 151 and 152 for re-recording of the track signals (channels 1 and 2).

In step S1013, a signal is again reproduced by the read head 211 reading the track signals (channels 1 and 2) concurrently. In step S1014, the signal reproduced by the read head 211 is amplified to a suitable voltage level by the reproduction amplifier 221. In step S1015, the amplified signal is subjected to signal level detection by the level detector 93 in the AGC 224. In step S1016, the measured signal level is sent to the phase control signal generator 90 whereby the level is retained as Level_1. In step S1017, the phase control signal generator 90 compares Level_0 with Level_1. If Level_1 is found equal to or greater than Level_0 ("Yes"in step S1017), then step S1018 is reached. In step S1018, the phase control signal generator 90 replaces the value of Level_0 with that of Level_1 for an update. Steps S1009 through S1017 are then repeated.

If Level_1 is found less than Level_0 ("No" in step S1017), then step S1019 is reached. In step S1019, the phase control signal generator 90 supplies the output timing setter 142 with a control signal such as to delay the phase by $\pi/18$. In step S1020, given the control signal, the output timing setter 142 sets the delay in a manner delaying the phase by $\pi/18$. In step S1021, the learning-use record signal 82 is delayed for a phase delay of $\pi/18$ by the output timing setter 142 and recording-compensated by the recording compensator 145. In step S1022, the signals recording-compensated by the recording compensators 144 and 145 are output to the write heads 151 and 152 respectively for re-recording of the track signals (channels 1 and 2). In step S1023, a signal is again reproduced by the read head 211 reading the track signals (channels 1 and 2) concurrently. In step S1024, the signal reproduced by the read head 211 is amplified to a suitable voltage level by the reproduction amplifier 221. In step S1025, the amplified signal is subjected to signal level detection by the level detector 93 in the AGC 224. In step S1026, the measured signal level is sent to the phase control signal generator 90 whereby the level is newly retained as Level_1.

In step S1027, the phase control signal generator 90 compares Level_0 with Level_1. If Level_1 is found equal to or greater than Level_0 ("Yes" in step S1027), then step S1028 is reached. In step S1028, the phase control signal generator 90 replaces the value of Level_0 with that of Level_1 for an update. Steps S1019 through S1027 are then repeated.

If Level_1 is found less than Level_0 ("No" in step S1027), then step S1029 is reached. In step S1029, the phase control signal generator 90 supplies the output timing setter 142 with a control signal such as to advance the phase of the learning-use record signal 82 by $\pi/36$. In step S1030, given the control signal, the output timing setter 142 sets the delay in a manner advancing the phase by $\pi/36$. In step S1031, the learning-use record signal 82 is delayed for a phase advance of $\pi/36$ by the output timing setter 142 and recording-compensated by the recording compensator 145. In step S1032, the signals recording-compensated by the recording compensators 144 and 145 are output to the write heads 151 and 152 respectively for re-recording of the track signals (channels 1 and 2). In step S1033, a signal is again reproduced by the read head 211 reading the track signals (channels 1 and 2) concurrently. In step S1034, the signal reproduced by the read head 211 is amplified to a suitable voltage level by the reproduction amplifier 221. In step S1035, the amplified signal is subjected to signal level detection by the level detector 93 in the AGC 224. In step S1036, the measured signal level is sent to the phase control signal generator 90 whereby the level is newly retained as Level_1.

In step S1037, the phase control signal generator 90 compares Level_0 with Level_1. If Level_1 is found equal to or greater than Level_0 ("Yes" in step S1037), then step S1038 is reached. In step S1038, the phase control signal generator 90 replaces the value of Level_0 with that of Level_1 for an update. Steps S1029 through S1037 are then repeated.

If Level_1 is found less than Level_0 ("No" in step S1037), then step S1039 is reached. In step S1039, the process of aligning the phases of record signals is brought to an end.

Thereafter, steps similar to those described above are carried out on the track signals of channels 2 and 3 until phase misalignment is reduced to within $\pi/36$ [rad]. If the number of tracks is 3, then the process of phase alignment is complete at this point. Even if the number of tracks is more than 3, similar steps may be carried out for suitable phase alignment between adjacent track signals.

With this embodiment, as discussed above, phase alignment may be performed in three stages. Phases are initially aligned with a low degree of accuracy ($\pi/6$) in the first stage, followed by the second and third stages for increasingly higher degrees of accuracy ($\pi/18$, $\pi/36$), until the phase misalignment between the track signals is brought to within the targeted accuracy.

Figure 13:
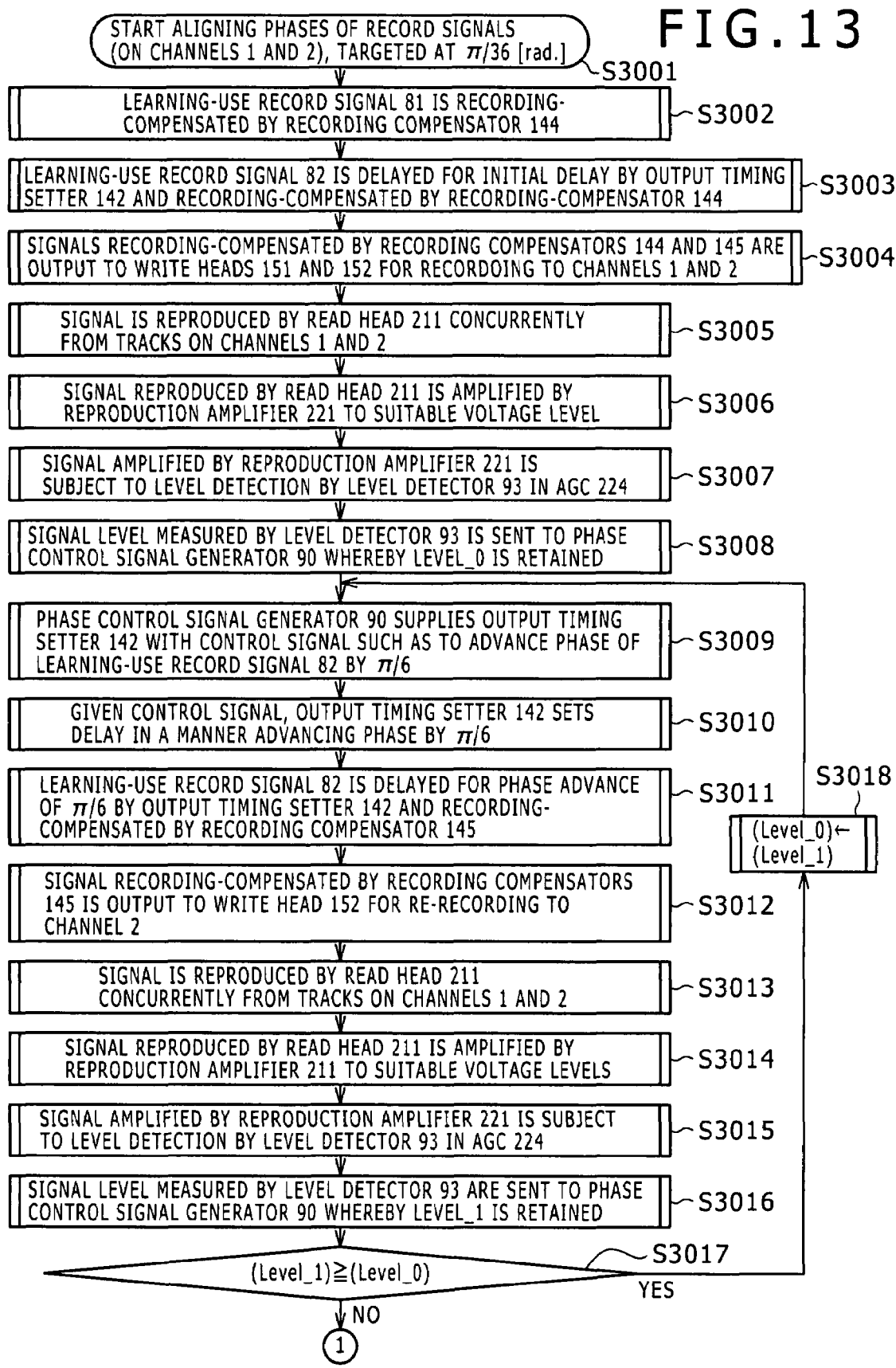
FIG. 13 is a flowchart of steps constituting a variation of the track signal phase aligning process shown in FIGS. 11 and 12.
Figure 14:
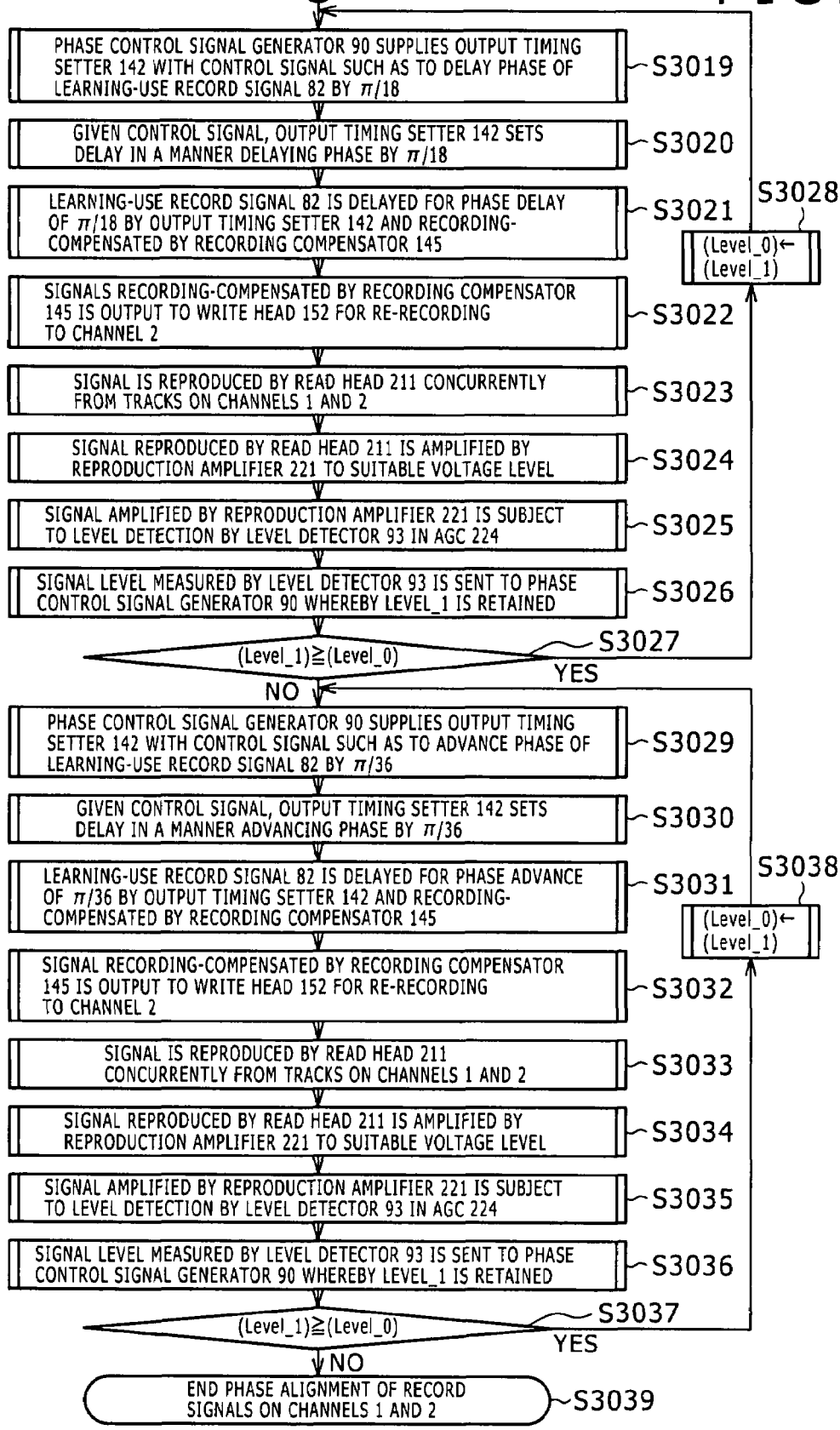
FIG. 14 is a flowchart continued from FIG. 13.

Explained below is a variation of the above-described process for aligning phases between adjacent track signals. FIG. 13 is a flowchart of steps constituting this variation of the track signal phase aligning process, and FIG. 14 is a flowchart continued from FIG. 13.

In step S3001, the process of aligning phases between the track signal (channel 1) to be recorded by the write head 151 and the track signal (channel 2) to be recorded by the write head 152 is started in the setup of FIG. 10.

In step S3002, the learning-use record signal 81 is recording-compensated by the recording compensator 144. In step S3003, the learning-use record signal 82 is delayed for an initial delay by the output timing setter 142 and recording-compensated by the recording compensator 145. In step S3004, the signals recording-compensated by the recording compensators 144 and 145 are output to the write heads 151 and 152 respectively for recording of the two adjacent track signals (channels 1 and 2). The learning-use record signals 81 and 82 are the same signal which is a repetitive signal of a single frequency.

In step S3005, a signal is reproduced by the read head 211 reading the track signals (channels 1 and 2) concurrently from the magnetic recording media 2. In step S3006, the signal reproduced by the read head 211 is amplified to a suitable voltage level by the reproduction amplifier 221. In step S3007, the amplified signal is subjected to signal level detection by the level detector 93 in the AGC 224. In step S3008, the measured signal level is sent to the phase control signal generator 90 whereby the level is retained as Level_0.

In step S3009, the phase control signal generator 90 supplies the output timing setter 142 with a control signal such as to advance the phase of the learning-use record signal 82 by $\pi/6$. In step S3010, given the control signal, the output timing setter 142 sets the delay in a manner advancing the phase by $\pi/6$. In step S3011, the learning-use record signal 82 is delayed for a phase advance of $\pi/6$ by the output timing setter 142 and recording-compensated by the recording compensator 145. In step S3012, the signal recording-compensated by the recording compensator 145 is output to the write head 152 for re-recording of the track signal (channel 2). It should be noted that unlike in the process shown in FIGS. 11 and 12 above, the track signal (channel 1) will not be recorded by the write head 151 at this point.

In step S3013, a signal is again reproduced by the read head 211 reading the track signals (channels 1 and 2) concurrently. In step S3014, the signal reproduced by the read head 211 is amplified to a suitable voltage level by the reproduction amplifier 221. In step S3015, the amplified signal is subjected to signal level detection by the level detector 93 in the AGC 224. In step S3016, the measured signal level is sent to the phase control signal generator 90 whereby the level is retained as Level_1. In step S3017, the phase control signal generator 90 compares Level_0 with Level_1. If Level_1 is found equal to or greater than Level_0 ("Yes" in step S3017), then step S3018 is reached. In step S3018, the phase control signal generator 90 replaces the value of Level_0 with that of Level_1 for an update. Steps S3009 through S3017 are then repeated.

If Level_1 is found less than Level_0 ("No" in step S3017), then step S3019 is reached. In step S3019, the phase control signal generator 90 supplies the output timing setter 142 with a control signal such as to delay the phase by $\pi/18$. In step S3020, given the control signal, the output timing setter 142 sets the delay in a manner delaying the phase by $\pi/18$. In step S3021, the learning-use record signal 82 is delayed for a phase delay of $\pi/18$ by the output timing setter 142 and recording-compensated by the recording compensator 145. In step S3022, the signal recording-compensated by the recording compensator 145 is output to the write head 152 for re-recording of the track signal (channel 2). In step S3023, a signal is again reproduced by the read head 211 reading the track signals (channels 1 and 2) concurrently. In step S3024, the signal reproduced by the read head 211 is amplified to a suitable voltage level by the reproduction amplifier 221. In step S3025, the amplified signal is subjected to signal level detection by the level detector 93 in the AGC 224. In step S3026, the measured signal level is sent to the phase control signal generator 90 whereby the level is newly retained as Level_1.

In step S3027, the phase control signal generator 90 compares Level_0 with Level_1. If Level_1 is found equal to or greater than Level_0 ("Yes" in step S3027), then step S3028 is reached. In step S3028, the phase control signal generator 90 replaces the value of Level_0 with that of Level_1 for an update. Steps S3019 through S3027 are then repeated.

If Level_1 is found less than Level_0 ("No" in step S3027), then step S3029 is reached. In step S3029, the phase control signal generator 90 supplies the output timing setter 142 with a control signal such as to advance the phase of the learning-use record signal 82 by $\pi/36$. In step S3030, given the control signal, the output timing setter 142 sets the delay in a manner advancing the phase by $\pi/36$. In step S3031, the learning-use record signal 82 is delayed for a phase advance of $\pi/36$ by the output timing setter 142 and recording-compensated by the recording compensator 145. In step S3032, the signal recording-compensated by the recording compensators 144 and 145 is output to the write head 152 for re-recording of the track signal (channel 2) to the magnetic recording media 2. In step S3033, a signal is reproduced by the read head 211 reading the track signals (channels 1 and 2) concurrently. In step S3034, the signal reproduced by the read head 211 is amplified to a suitable voltage level by the reproduction amplifier 221. In step S3035, the amplified signal is subjected to signal level detection by the level detector 93 in the AGC 224. In step S3036, the measured signal level is sent to the phase control signal generator 90 whereby the level is newly retained as Level_1.

In step S3037, the phase control signal generator 90 compares Level_0 with Level_1. If Level_1 is found equal to or greater than Level_0 ("Yes" in step S3037), then step S3038 is reached. In step S3038, the phase control signal generator 90 replaces the value of Level_0 with that of Level_1 for an update. Steps S3029 through S3037 are then repeated.

If Level_1 is found less than Level_0 ("No" in step S3037), then step S3039 is reached. In step S3039, the process of aligning the phases of record signals is terminated.

Thereafter, steps similar to those described above are carried out on the track signals of channels 2 and 3 until phase misalignment is reduced to within $\pi/36$ [rad]. If the number of tracks is 3, then the process of phase alignment is complete at this point. Even if the number of tracks is more than 3, similar steps may be carried out for suitable phase alignment between adjacent track signals.

With this embodiment, as discussed above, phase alignment may be performed in three stages. Phases are initially aligned with a low degree of accuracy ($\pi/6$) in the first stage, followed by the second and third stages for increasingly higher degrees of accuracy ($\pi/18$, $\pi/36$), until the phase misalignment between the track signals is brought to within the targeted accuracy of $\pi/36$.

Described below is a typical process for aligning the phases of adjacent track signals using what is known as the steepest descent method. This is an example in which the phase misalignment between adjacent tracks is reduced to within $\pi/36$ [rad]. It should be noted that this target is only for illustrative purposes and may be replaced by any other appropriate target to be established to meet specific accuracy requirements of an actually implemented system.

Figure 15:
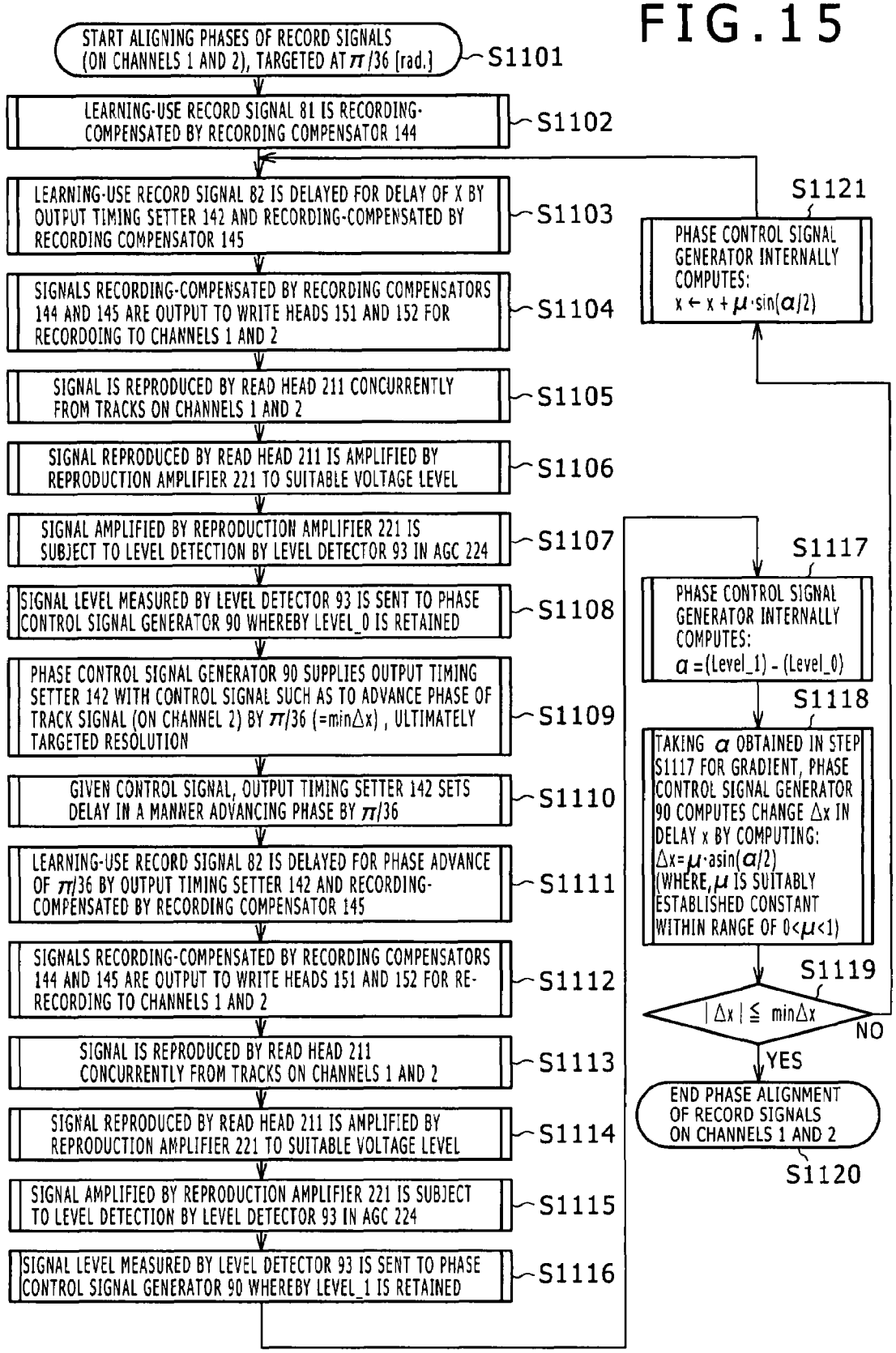
FIG. 15 is a flowchart of steps constituting the process of aligning phases between adjacent track signals according to the steepest descent method.

FIG. 15 is a flowchart of steps constituting the process of aligning phases between adjacent track signals according to the steepest descent method.

In step S1101, as in the preceding examples, the process of aligning phases between the track signal (channel 1) to be recorded by the write head 151 and the track signal (channel 2) to be recorded by the write head 152 is started in the setup of FIG. 10.

In step S1102, the learning-use record signal 81 is recording-compensated by the recording compensator 144. In step S1103, the learning-use record signal 82 is delayed for an initial delay by the output timing setter 142 and recording-compensated by the recording compensator 145. In step S1104, the signals recording-compensated by the recording compensators 144 and 145 are output to the write heads 151 and 152 respectively for recording of the two adjacent track signals (channels 1 and 2) to the magnetic recording media 2. The learning-use record signals 81 and 82 are the same signal which is a repetitive signal of a single frequency.

In step S1105, a signal is reproduced by the read head 211 reading the track signals (channels 1 and 2) concurrently from the magnetic recording media 2. In step S1106, the signal reproduced by the read head 211 is amplified to a suitable voltage level by the reproduction amplifier 221. In step S1107, the amplified signal is subjected to signal level detection by the level detector 93 in the AGC 224. In step S1108, the measured signal level is sent to the phase control signal generator 90 whereby the level is retained as Level_0.

In step S1109, the phase control signal generator 90 supplies the output timing setter 142 with a control signal such as to advance the phase of the track signal (channel 2) by the targeted resolution of $\pi/36$ (=min$\Delta x$). In step S1110, the learning-use record signal 82 is delayed for a phase advance of $\pi/36$ by the output timing setter 142. In step S1111, the learning-use record signal 82 is recording-compensated by the recording compensator 145. In step S1112, the resulting signals are output to the write heads 151 and 152 for concurrent re-recording of the track signals (channels 1 and 2) to the magnetic recording media 2.

In step S1113, a signal is again reproduced by the read head 211 reading the track signals (channels 1 and 2) concurrently. In step S1114, the signal reproduced by the read head 211 is amplified to a suitable voltage level by the reproduction amplifier 221. In step S1115, the amplified signal is subjected to signal level detection by the level detector 93 in the AGC 224. In step S1116, the measured signal level is sent to the phase control signal generator 90 whereby the level is retained as Level_1.

In step S1117, the phase control signal generator 90 computes the following expression (14):

$$\alpha = (\text{Level\_1}) - (\text{Level\_0}) \qquad (14)$$

In step S1118, taking the value $\alpha$ obtained above for a gradient, the phase control signal generator 90 calculates a change $\Delta x$ in the delay "x" using the following expression (15):

$$\Delta x = \mu \cdot a \sin(\alpha/2) \qquad (15)$$

where, $\mu$ denotes an update coefficient that is a constant suitably established within the range of $0 < \mu < 1$.

Thus if the expression $$|\Delta x| \leq \min \Delta x \qquad (16)$$

is found to hold ("Yes" in step S1119), that means the phase misalignment between the track signals (channels 1 and 2) falls within the targeted range of min$\Delta x$ (=$\pi/36$). In this case, step S1120 is reached and the process is terminated.

Thereafter, steps similar to those described above are carried out on the track signals of channels 2 and 3 until phase misalignment is reduced to within $\pi/36$ [rad]. If the number of tracks is 3, then the process of phase alignment is complete at this point. Even if the number of tracks is more than 3, similar steps may be carried out for suitable phase alignment between adjacent track signals.

If the expression (16) above is not found to hold, then step S1121 is reached. In step S1121, the delay "x" is updated using the following expression:

$$x \leftarrow +\mu \cdot a \sin(\alpha/2) \qquad (17)$$

Thereafter, step S1103 is reached again. The learning-use record signal 82 is then delayed by the updated amount "x" and again recorded by the write head 151 to the magnetic recording media 2 as the track signal (channel 2). The steps above are repeated until the expression (16) holds in step S1108.

In the above-described processes for aligning phases of adjacent track signals, it is assumed that the learning-use record signal has such a recording wavelength as to constitute a reproduction signal that is as close to a sinusoidal signal as possible. That is, it is preferred to use not those record signals of long wavelengths which would constitute reproduction signals of solitary waves but record signals of short wavelengths which will form reproduction signals close to sinusoidal signals.

Second Embodiment

A second embodiment of the present invention will now be described by referring to FIGS. 16 through 19. This embodiment is structured as a single-head, multi-track magnetic recording and reproducing apparatus.

Figure 16:
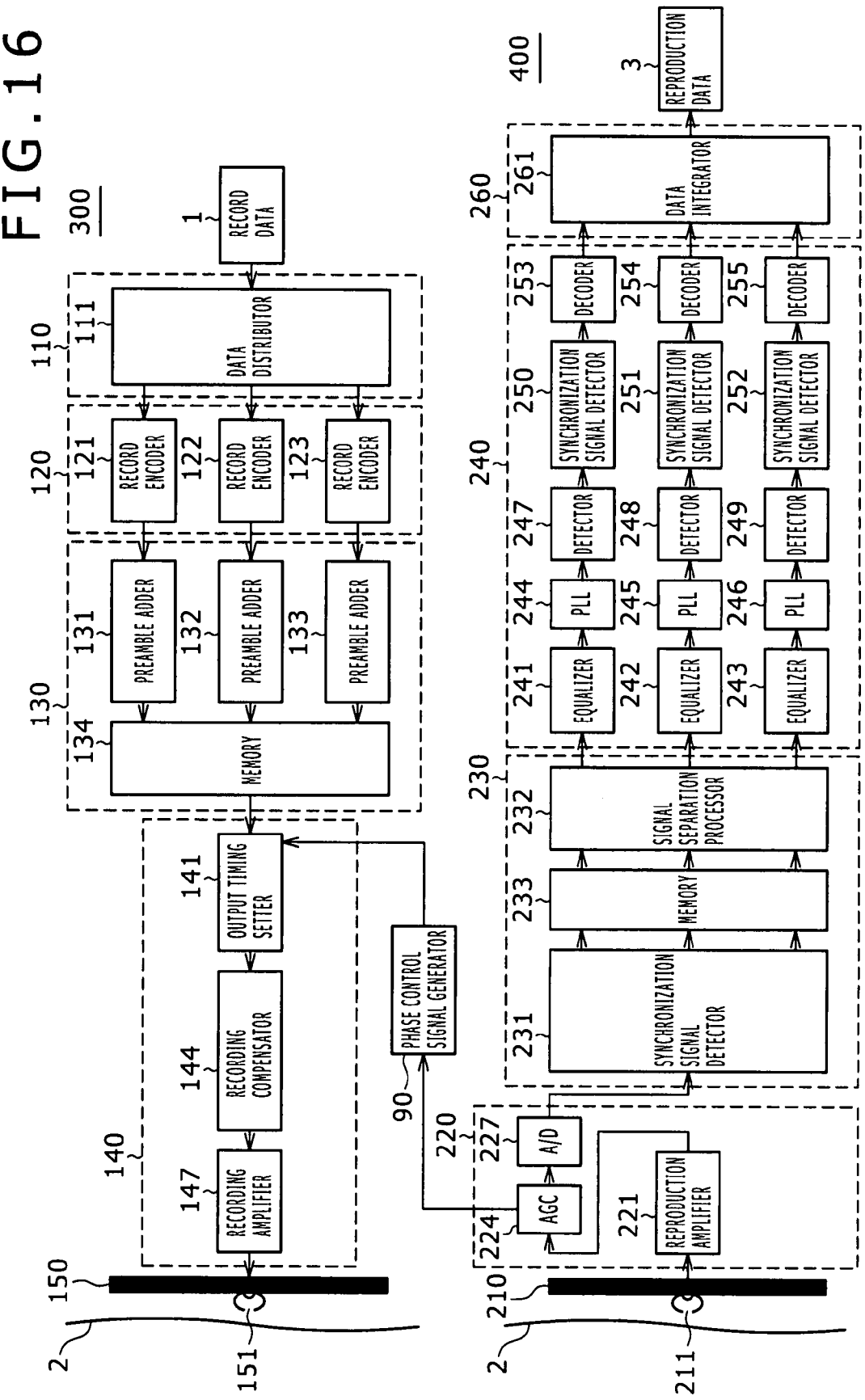
FIG. 16 is a block diagram showing typical structures of a recording device and a reproduction device constituting a single-head magnetic recording and reproducing apparatus practiced as another embodiment of the present invention.

FIG. 16 is a block diagram showing a typical structure of the magnetic recording and reproducing apparatus practiced as the second embodiment of the present invention. This apparatus has a recording device 300 and a reproduction device 400.

The recording device 300 has a memory 134 furnished interposingly between a plurality of preamble adders 131, 132 and 133 of a multi-track separation pattern addition device 130 on the one hand and an output timing setter 141 on the other hand. The memory 134 accommodates record data of at least one unit. The memory 134 also stores encoded record sequences including separation patterns specific to the tracks constituting the unit.

The reproduction unit 400 has a memory 233 furnished interposingly between a synchronization-signal detector 231 located upstream and a signal separation processor 232, the memory 233 accommodating reproduction signals of at least one unit. A read head 211 starts reproducing signals from a plurality of tracks (T1, T2) from the starting position of a given unit (e.g., position P4 in FIG. 17). The read head 211 then moves to a position P5 to reproduce signals from a plurality of tracks (T2, T3), before moving to a position P6 to reproduce a signal from a track T3, with no further track shown recorded subsequent to the track T3 in the example of FIG. 17. In this single-head setup, the tracing of record tracks for reproduction is repeated at least as many times as the number of record tracks per unit. In other words, the tracing of record tracks may be repeated more times than the number of all record tracks involved per unit. In such cases, every record track per unit is traced at least once. The memory 233 accommodates the signals reproduced per unit by the read head 211 from the positions to which the read head 211 has moved. That is, the memory 233 stores the signals which have been reproduced by the read head 211 from the tracks at the staggered positions and which follow the separation patterns detected by the synchronization signal detector 231 located upstream.

The recording device 300 and reproduction device 400 are interconnected through a phase control signal generator 90. The phase control signal generator 90 serves to align phases of record signals to be recorded to every two adjacent tracks among a plurality of tracks on the magnetic recording media 2.

What follows is a description of basic recording and reproduction processing carried out by the magnetic recording and reproducing apparatus of the second embodiment.

Figure 18:
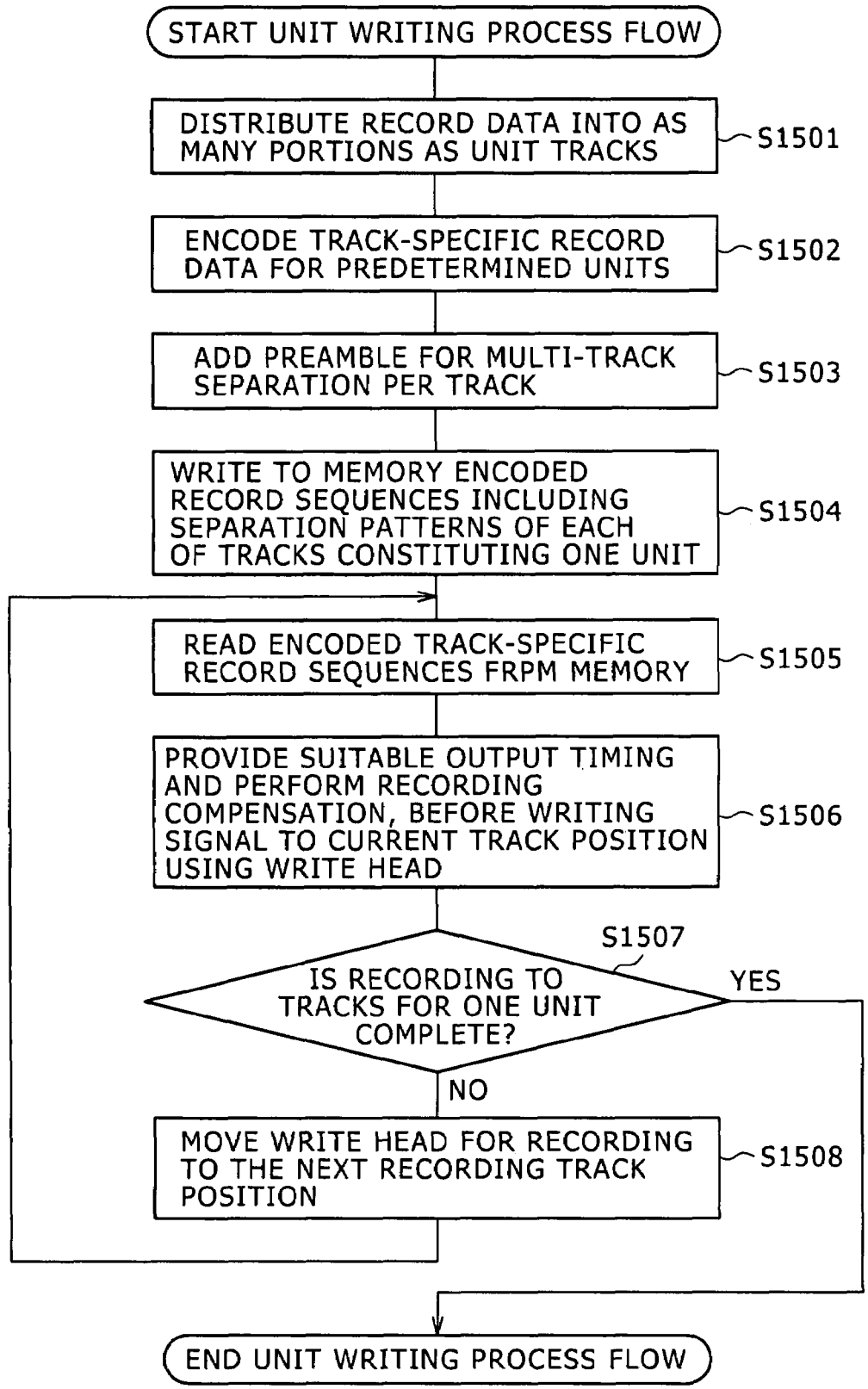
FIG. 18 is a flowchart of steps constituting a writing process performed by the magnetic recording and reproducing apparatus of FIG. 16.

The basic process of recording is the first to be discussed. FIG. 18 is a flowchart of steps constituting a writing process performed by the second embodiment.

In step S1501, a multi-track formation device 110 of the recording device 100 distributes input record data 1 into as many data portions as the number of tracks. In step S1502, the distributed data portions are encoded by record encoders 121, 122 and 123 of a multi-track record encoding device 120 into code word sequences, with the recording and reproduction characteristics of the magnetic recording media 2 taken into consideration. At this point, the code word sequences are each furnished with information necessary for data demodulation such as synchronization signals.

In step S1503, preamble adders 131, 132 and 133 of the multi-track separation pattern addition device 130 add preamble codes to predetermined positions of the generated track-specific code word sequences, whereby encoded record sequences are acquired. In step S1504, the track-specific encoded record sequences thus obtained are stored into the memory 134.

In step S1505, the encoded record sequence specific to the track to be recorded first is retrieved from the memory 134. In step S1506, the encoded record sequence is given a suitable timing by the output timing setter 141 and recording-compensated by the recording compensator 144 for optimum recording to the magnetic recording media 2, before being subjected to voltage-to-current conversion by a recording amplifier 147. After the conversion, the current is sent to the write head 151 for recording to the magnetic recording media 2.

After the recording of one track, step S1507 is reached. In step S1507, a check is made to determine if the recording of all tracks for one unit has ended. If the recording of all tracks is not found to have ended ("No" in step S1507), then step S1508 is reached and the write head 151 is moved to the next position. The encoded record sequence for the next track is then retrieved from the memory 134 and the subsequent steps for recording are repeated. The steps above are repeated until the recording of all tracks of the unit is completed.

Figure 17:
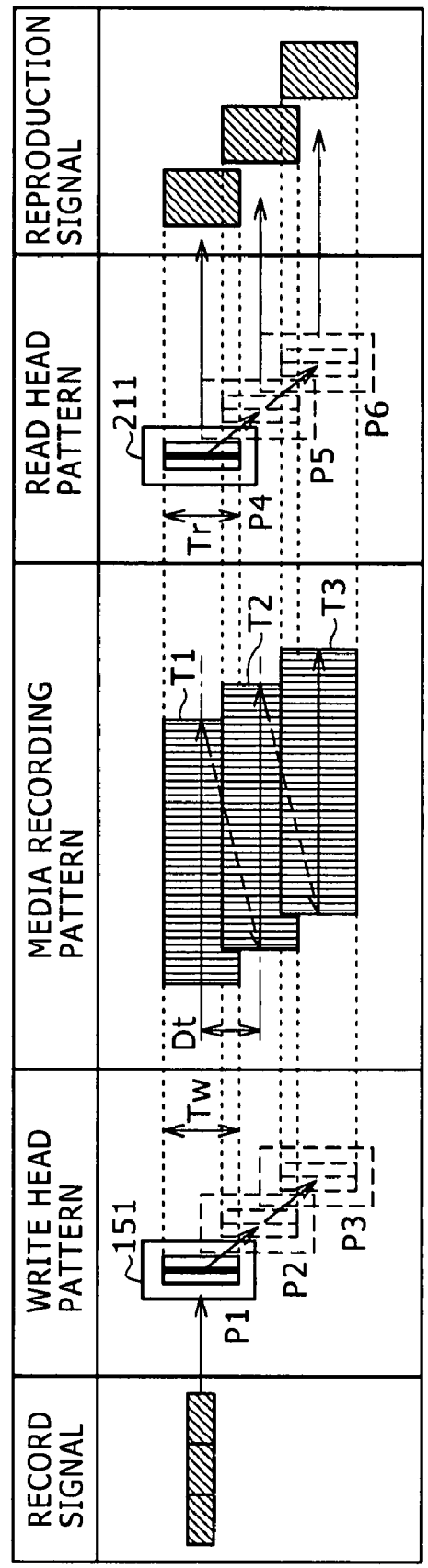
FIG. 17 is a schematic view showing write head patterns, media recording patterns, and read head patterns derived from the typical single-head setup.

Illustratively, as shown in FIG. 17, the write head 151 is first moved to a position P1 for recording of a first track, then to a position P2 for recording of another track, and then to a position P3 for recording of yet another track.

The basic process of reproduction will now be described. FIG. 19 is a flowchart of steps constituting a reading process performed by the second embodiment.

In step S1601, the read head 211 moved to the initial position reproduces signals from a plurality of tracks. In step S1602, the output of a reproduction amplifier 221 is adjusted in amplitude by an AGC 224. The output of the AGC 224 is converted to digital form by an A/D converter 225 before being forwarded to the synchronization signal detector 231. In step S1603, the synchronization signal detector 231 detects from the output of the A/D converter 225 synchronization signals by which to determine the starting positions of separation patterns. In step S1604, track-specific reproduction signals are stored into the memory 233.

In step S1606, the read head 211 moved to the next position reproduces signals from a plurality of tracks. The track-specific reproduction signals are stored into the memory 233 in the same manner as described above. If needed, a low-pass filter may be furnished immediately upstream of the A/D converter 225 to remove unnecessary high-pass components. The AGC 224 may be positioned downstream of the A/D converter 225 to control gains following quantization.

In step S1605, a check is made to determine whether the reproduction signals of one unit have all been stored into the memory 233. If the reproduction signals of one unit are found to have been stored ("Yes" in step S1605), step S1607 is reached. In step S1607, the signal separation processor 232 retrieves the reproduction signals of one unit from the memory 233 and, using the separation patterns whose starting positions were determined from synchronization signals, performs channel estimation computations. In step S1608, the signal separation processor 232 retrieves from the memory 233 the reproduction signals of as many tracks as are needed to generate reproduction signals of the record tracks involved. In step S1609, the signal separation processor 232 derives the reproduction signals of the record tracks from the retrieved reproduction signals and from the result of the channel estimation computations. In step S1610, the reproduction data of the tracks are demodulated by a multi-track demodulation device 240 in the same manner as with the reproduction device 200 in FIG. 2. In step S1611, the acquired reproduction data of the tracks constituting one unit are combined by a restoration device 260 into the original record data.

In the second embodiment, the phase control signal generator 90 causes the output timing setter 141 of the recording device 300 to control the output timings of track-specific record signals in such a manner as to reduce the phase misalignment between adjacent track signals to within a targeted range, on the basis of the output from the level detector 93 in the AGC 224 of the reproduction device 400. The specific steps to effect the control procedure are basically the same as those performed by the first embodiment, except that the signals of adjacent tracks are recorded on a temporally separated basis by the single-head setup of this second embodiment.

Third Embodiment

The present invention is not limited to applications of non-azimuth magnetic recording and reproduction; the invention may also be applied to the so-called double azimuth magnetic recording and reproduction system involving a plurality of azimuth angles.

Figure 20:
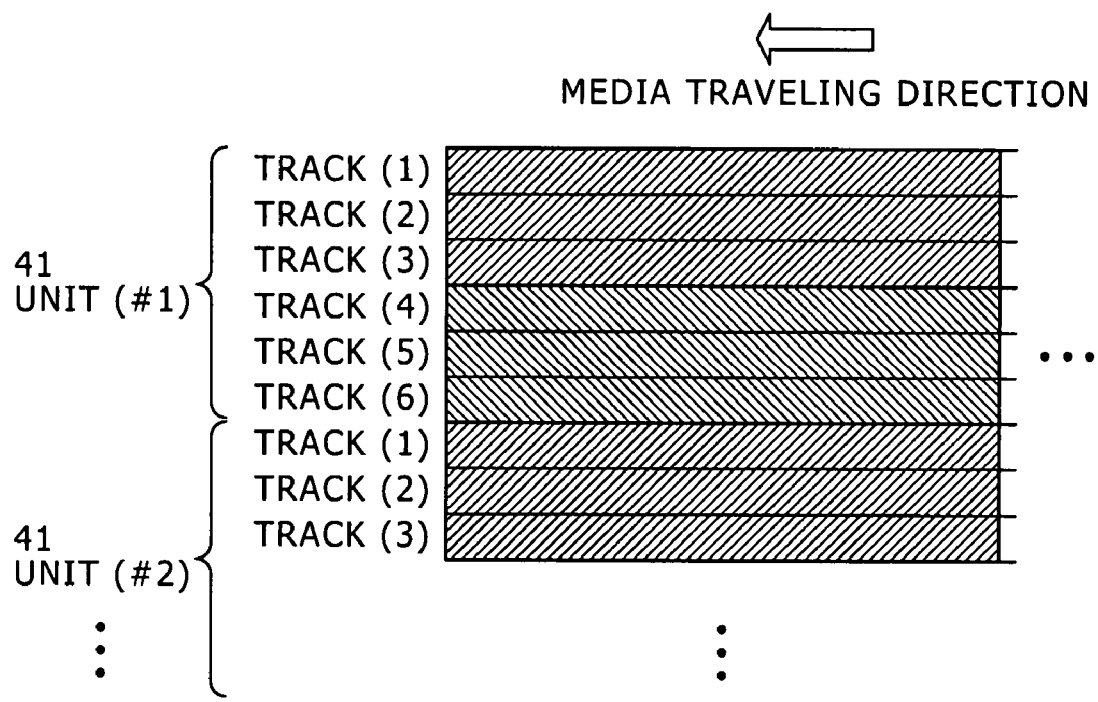
FIG. 20 is a conceptual view showing one unit of tracks to be recorded by the double azimuth technique to magnetic recording media.
Figure 21:
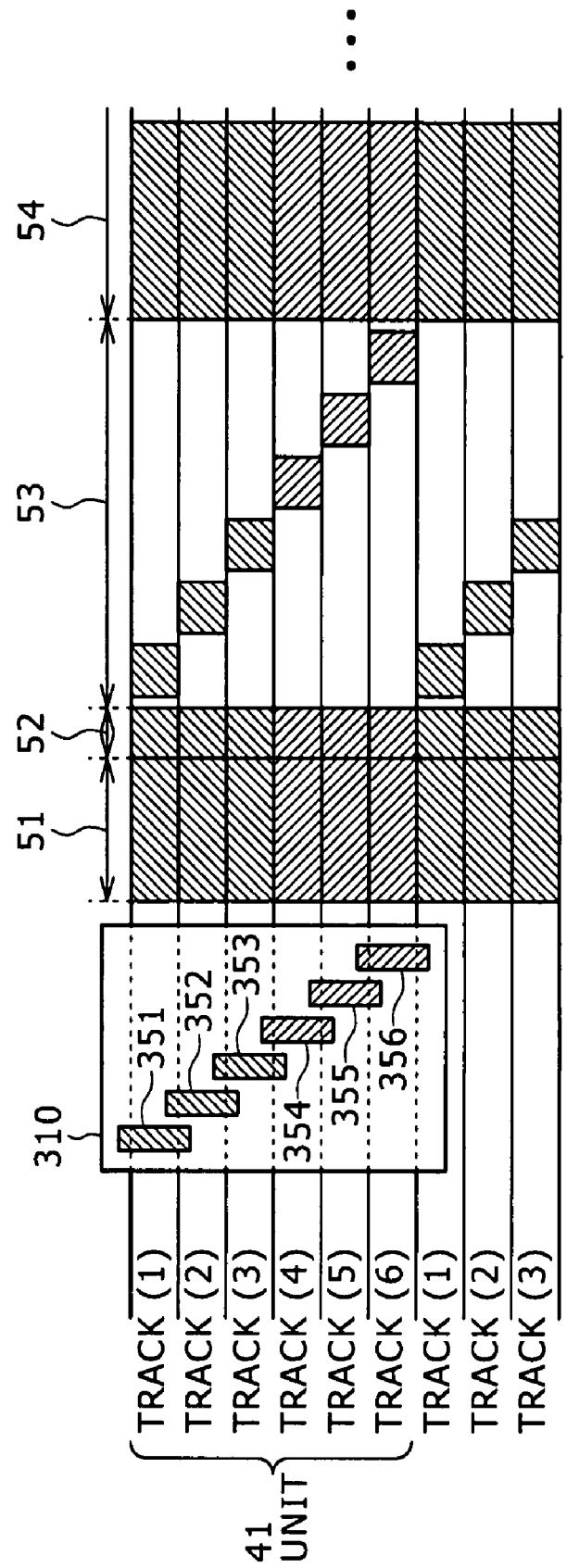
FIG. 21 is a schematic view showing typical separation patterns to be recorded to the tracks depicted in FIG. 20.

FIG. 20 is a conceptual view showing one unit of tracks to be recorded by the double azimuth technique to magnetic recording media. FIG. 21 is a schematic view showing typical separation patterns to be recorded to the tracks depicted in FIG. 20.

A third embodiment of this invention having a double azimuth head arrangement uses six write heads and six read heads. Although FIG. 20 shows only the read head arrangement, the same applies to the write heads as well. Of the six read heads 351, 352, 353, 354, 355 and 356, three continuous read heads 351, 352 and 353 are given an azimuth angle different from that of the remaining three continuous read heads 354, 355 and 356. In other words, tracks (1) through (3) have an azimuth angle different from that of tracks (4) through (6). The tracks (1) through (6) constitute a single unit 41 of processing. No guard areas are provided in the double azimuth setup.

Where preambles are recorded, they are furnished with six separation patterns as shown in FIG. 21.

The third embodiment handles the tracks (1) through (6) as one unit of processing for use in executing output channel estimation and signal separation computations thereby separating track-specific reproduction signals. Alternatively, the three continuous tracks (1) through (3) sharing one azimuth angle may be treated as one unit of processing and the other three continuous tracks (4) through (6) sharing another azimuth angle as another unit of processing. In this case, where the recording of preambles is concerned, three separation patterns for use with the first embodiment (e.g., second preambles 53 shown in FIG. 6) may be used to represent three continuous track portions in FIG. 20: tracks (1) through (3) of a first unit #1, tracks (4) through (6) of a second unit #2, and tracks (1) through (3) of a third unit #3.

Figure 22:
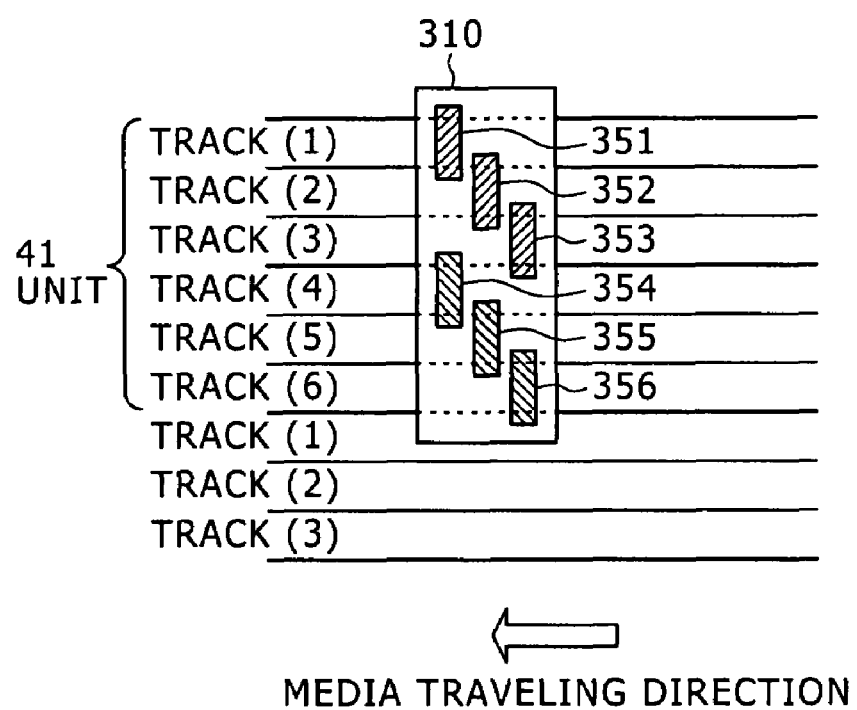
FIG. 22 is a schematic view showing a typical layout of read heads according to the double azimuth magnetic recording and reproducing method.

A plurality of write heads may need to be suitably positioned in relation to one another in consideration of the fact that during recording, the signal recorded by an upstream head is overwritten with the signal recorded by a downstream head (FIG. 21). By contrast, the read heads may be positioned in a far freer manner because there is no need for such consideration. Illustratively, the read heads may be positioned as shown in FIG. 21 or as indicated in FIG. 22.

Fourth Embodiment

The foregoing description was about the present invention being applied to magnetic recording and reproducing apparatuses of the linear recording type. However, this is not limitative of the present invention. The invention may also be applied advantageously to magnetic recording and reproducing apparatuses of the helical scan type.

Figure 23:
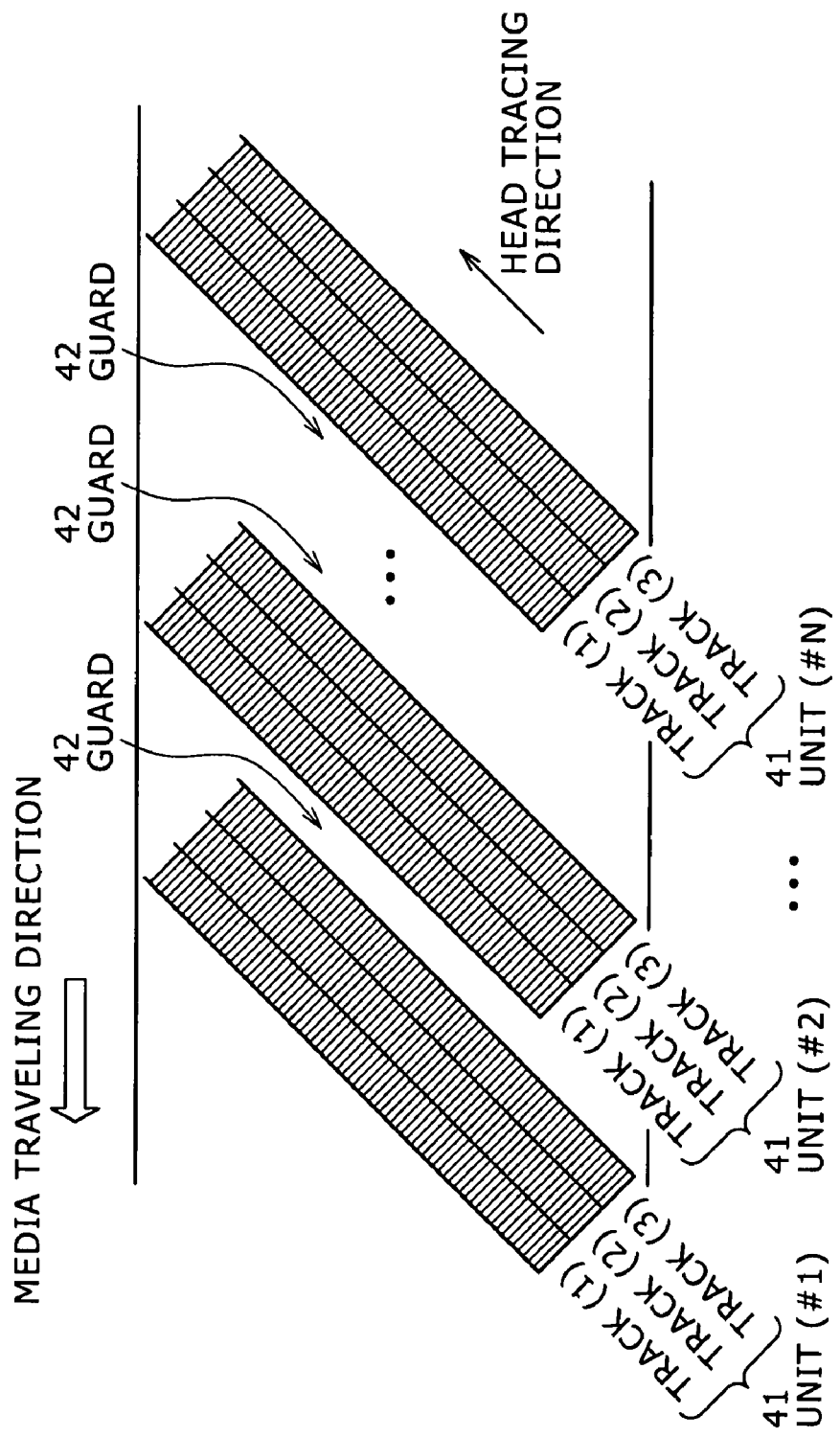
FIG. 23 is a conceptual view showing units of tracks to be recorded to magnetic recording media by the helical scan method involving a plurality of write heads.
Figure 24:
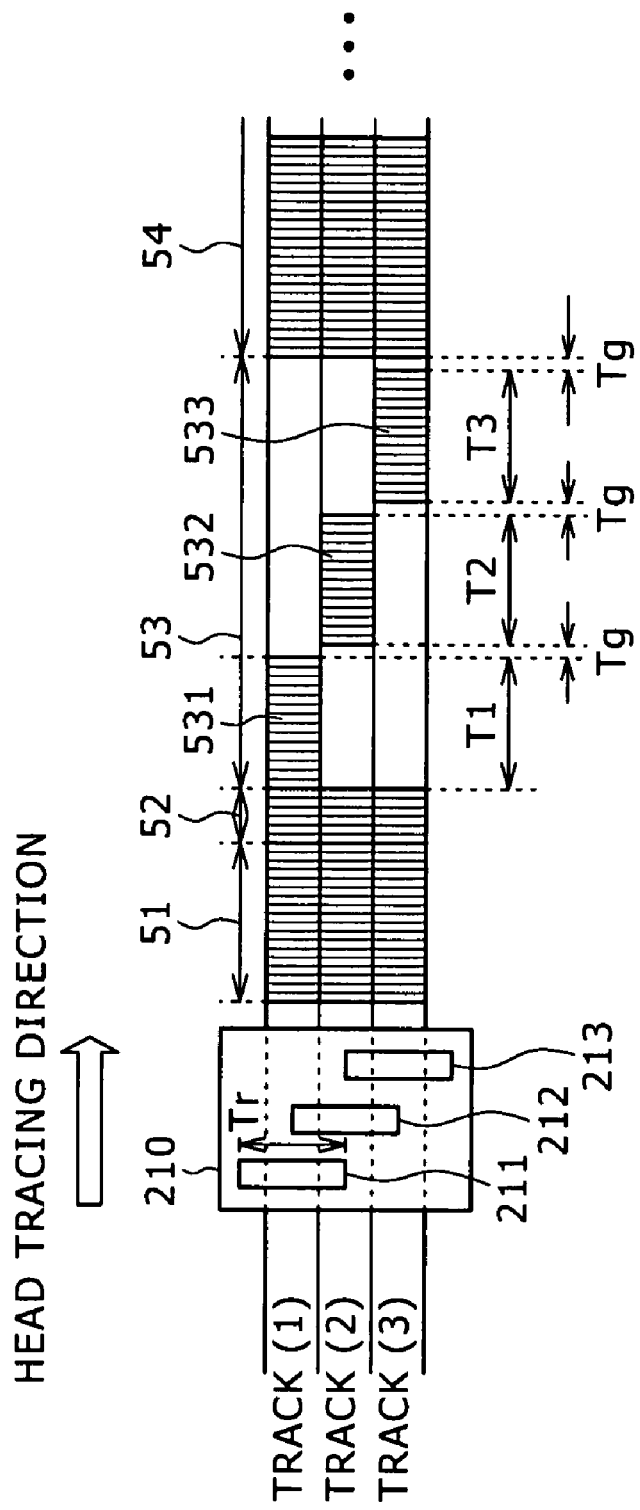
FIG. 24 is a schematic view showing separation patterns to be recorded to the tracks in FIG. 23.

FIG. 23 is a conceptual view showing units of tracks to be recorded to magnetic recording media by the helical scan method involving a plurality of write heads. According to the helical scan method, guards 42 are also furnished between the units 41. The separation patterns to be recorded to tracks (1) through (3) may be the same as those for use with the linear recording setup (FIG. 6).

Figure 25:
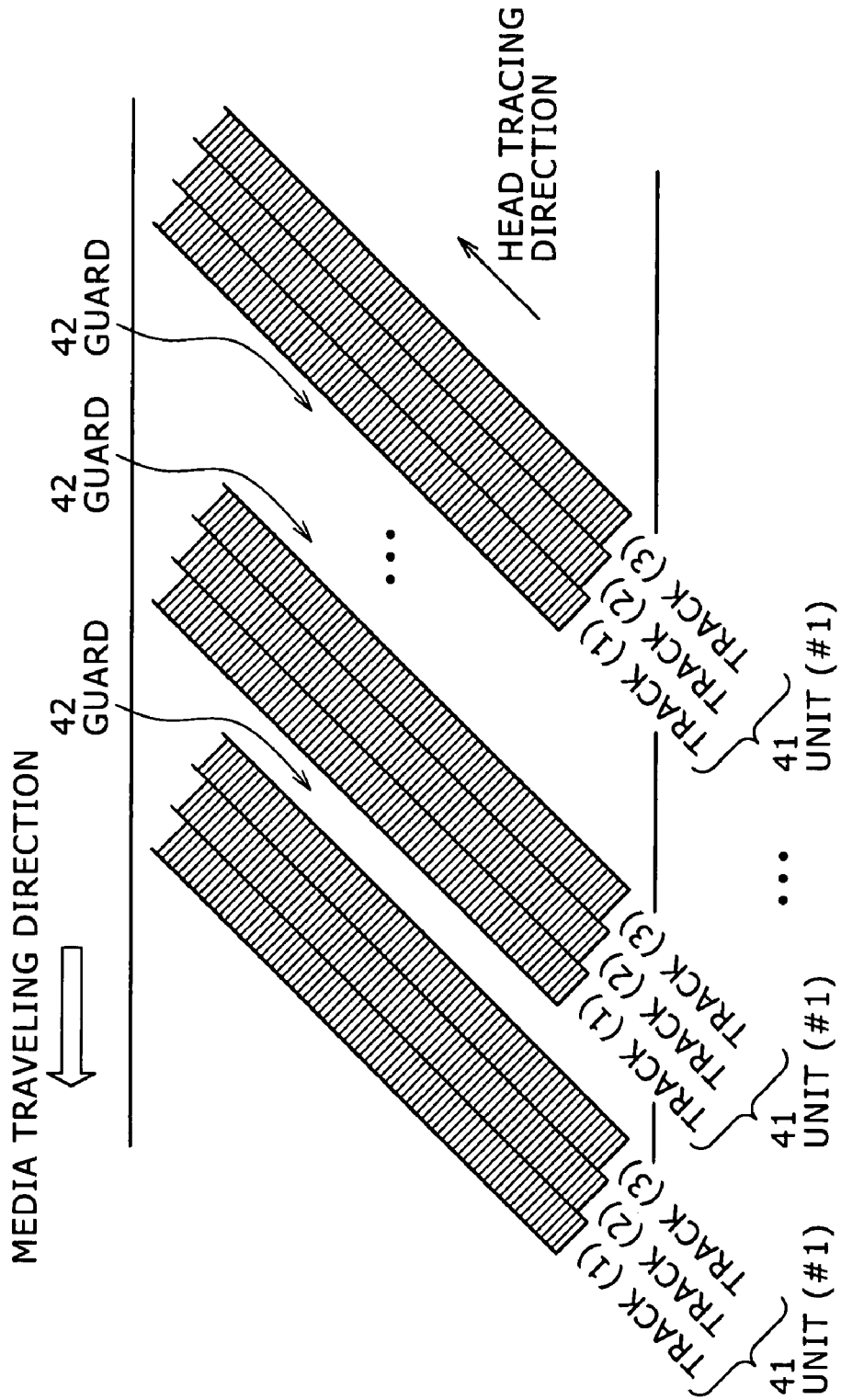
FIG. 25 is a conceptual view showing units of tracks to be recorded to magnetic recording media by the helical scan method involving a single write head.
Figure 26:
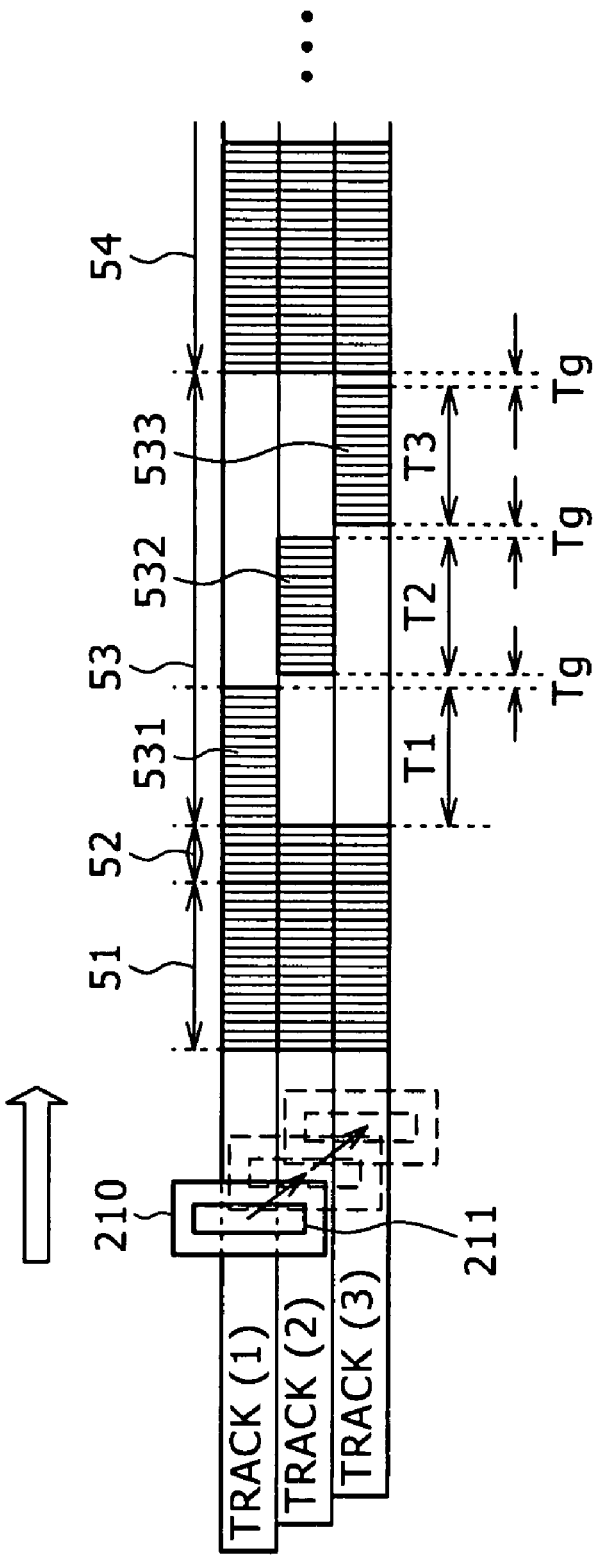
FIG. 26 is a schematic view showing separation patterns to be recorded to the tracks in FIG. 25.

FIG. 25 is a conceptual view showing units of tracks to be recorded to magnetic recording media by the helical scan method involving a single write head. The track arrangement is the same as with the multiple-head setup except that the tracks are recorded by the single write head moved to different positions. The separation patterns to be recorded to the tracks (1) through (3) may be the same as those of the linear recording method (FIG. 6) as shown in FIG. 26. Where the positions at which to start recording the tracks are staggered, the starting positions of the separation patterns are arranged to be adjusted accordingly as indicated in FIGS. 25 and 26.

Figure 27:
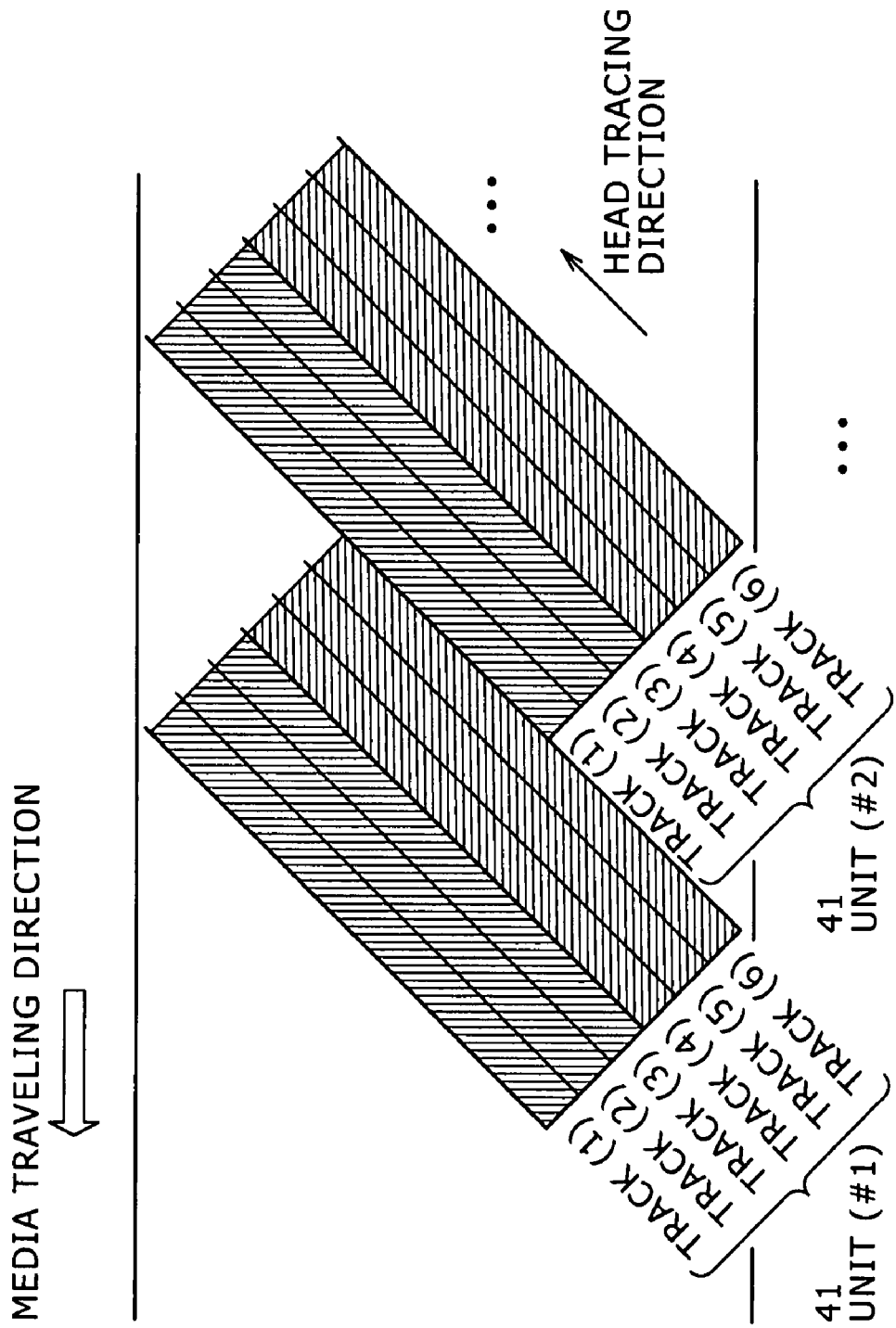
FIG. 27 is a conceptual view showing units of tracks to be recorded to magnetic recording media by the double azimuth helical scan method involving a plurality of write heads.
Figure 28:
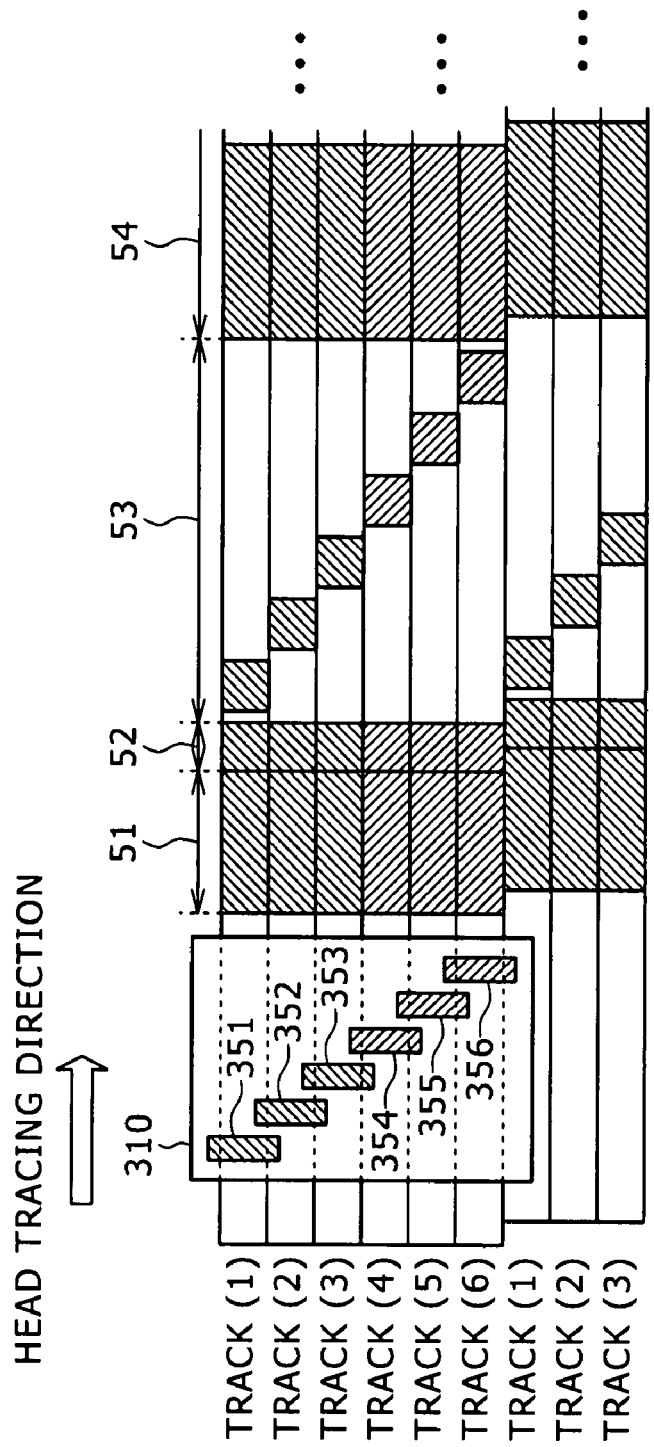
FIG. 28 is a schematic view showing separation patterns to be recorded to the tracks in FIG. 27.

FIG. 27 is a conceptual view showing units of tracks to be recorded to magnetic recording media by the double azimuth helical scan method involving a plurality of write heads. FIG. 28 is a schematic view showing separation patterns to be recorded by the double azimuth helical scan method to the tracks (1) through (6). As illustrated, this invention can also be applied effectively to double azimuth helical scan apparatuses using a plurality of write heads each.

FIG. 29 is a conceptual view showing units of tracks to be recorded to magnetic recording media by the double azimuth helical scan method having a single write head furnished per azimuth angle. FIG. 30 is a schematic view showing separation patterns to be recorded by the double azimuth helical scan method to the magnetic recording media. As illustrated, this invention can be applied just as advantageously to double azimuth helical scan apparatuses having one write head furnished per azimuth angle.

Where any one of the above-outlined methods is in use, the separation patterns to be recorded to the tracks involved may be the same as those for use with the linear recording method. Where the positions at which to start recording the tracks are staggered, the starting positions of the separation patterns are arranged to be adjusted accordingly as shown in FIGS. 29 and 30.

It should be understood by those skilled in the art that various modifications, combinations, sub-combinations and alterations may occur depending on design requirements and other factor in so far as they are within the scope of the appended claims or the equivalents thereof.

What is claimed is:

1. A magnetic recording and reproducing apparatus comprising:
    a recording device configured to record with a write head a plurality of tracks constituting a unit of signal processing for data detection, to magnetic recording media;
    a reproduction device configured to reproduce with a read head a plurality of reproduction signals concurrently from said plurality of tracks on said magnetic recording media in different positional relations to said tracks, said reproduction signals being arranged into said one unit for signal processing thereby generating the track-specific reproduction signals; and
    a phase alignment device configured to align phases of record signals between adjacent tracks among said plurality of tracks recorded by said recording device to said magnetic recording media.

2. The magnetic recording and reproducing apparatus according to claim 1, wherein said phase alignment device records the same learning signal to each of said adjacent tracks and, based on said reproduction signals reproduced by said reproduction device, determines an optimum delay for the signal to be recorded to one of said adjacent tracks relative to the signal to be recorded to the other one of said adjacent tracks.

3. The magnetic recording and reproducing apparatus according to claim 2, wherein said same learning signal is a repetitive signal of a single frequency.

4. The magnetic recording and reproducing apparatus according to claim 2, wherein said phase alignment device determines said optimum delay based on an amplitude value of said reproduced signals.

5. The magnetic recording and reproducing apparatus according to claim 2, wherein said phase alignment device determines said optimum delay in an increasingly accurate manner through a plurality of steps.

6. The magnetic recording and reproducing apparatus according to claim 2, wherein said phase alignment device determines said optimum delay using what is known as the steepest descent method.

7. The magnetic recording and reproducing apparatus according to claim 1, wherein, through said signal processing, said reproduction device acquires channel estimation information constituting position information about said read head relative to said plurality of tracks, and obtains said track-specific reproduction signals based on said channel estimation information and on said reproduction signals reproduced from said tracks in different positional relations to said tracks.

8. The magnetic recording and reproducing apparatus according to claim 7, wherein said recording device records a signal having at least a minimum recording wavelength as a separation pattern to a position unique to each of said tracks so that said position information about said read head relative to said plurality of tracks may be generated by said reproduction device; and
    wherein, based on reproduction signals of said separation pattern, said reproduction device acquires said channel estimation information through said signal processing.

9. The magnetic recording and reproducing apparatus according to claim 7, wherein said reproduction device acquires said channel estimation information using tracking servo information.

10. The magnetic recording and reproducing apparatus according to claim 8, wherein said recording device records a learning signal pattern to a position ahead of said separation pattern, said learning signal pattern being intended for automatic gain control and/or bit synchronization detection.

11. The magnetic recording and reproducing apparatus according to claim 8, wherein said recording device records a synchronization signal pattern to a position ahead of said separation pattern, said synchronization signal pattern being used to detect the position of said separation pattern.

12. The magnetic recording and reproducing apparatus according to claim 1, wherein said recording device records said plurality of tracks by moving a single individual write head constituting said write head; and
    wherein said reproduction device generates a plurality of reproduction signals from said plurality of tracks by moving a single individual read head constituting said read head.

13. The magnetic recording and reproducing apparatus according to claim 1, wherein said recording device records said plurality of tracks using a plurality of individual write heads constituting said write head; and
    wherein said reproduction device generates a plurality of reproduction signals from said plurality of tracks using a plurality of individual read heads constituting said read head.

14. The magnetic recording and reproducing apparatus according to claim 1, wherein said recording device records to said magnetic recording media a plurality of units of tracks for signal processing intended for data detection, each of said units being constituted by a plurality of tracks, said recording device further adding a write inhibit guard area between said plurality of units.

15. The magnetic recording and reproducing apparatus according to claim 1, wherein said plurality of tracks are arranged to have the same azimuth.

16. The magnetic recording and reproducing apparatus according to claim 13, wherein said plurality of individual write heads are arranged in such a manner that each of two outermost tracks among said plurality of tracks becomes wider than each of the other tracks;
    wherein said individual read heads are each arranged to be narrower than each of said two outermost tracks among said plurality of tracks; and
    wherein said recording device records a plurality of units constituted by a plurality of tracks each in such a manner as to minimize gaps between said units.

17. The magnetic recording and reproducing apparatus according to claim 13, wherein sad plurality of individual write heads are arranged to have the same width each;
    wherein each of two outermost individual read heads among said plurality of individual read heads is arranged to be narrower than each of the other individual read heads; and
    wherein said recording device records a plurality of units constituted by a plurality of tracks each in such a manner as to minimize gaps between said units.

18. A magnetic recording and reproducing method comprising the steps of:
    recording with a write head a plurality of tracks constituting a unit of signal processing for data detection, to magnetic recording media;
    reproducing with a read head a plurality of reproduction signals concurrently from said plurality of tracks on said magnetic recording media in different positional relations to said tracks, said reproduction signals being arranged into said one unit for signal processing thereby generating the track-specific reproduction signals; and
    aligning phases of record signals between adjacent tracks among said plurality of tracks recorded by said write head to said magnetic recording media.

19. The magnetic recording and reproducing method according to claim 18, wherein said phase aligning step includes
    recording the same learning signal to each of said adjacent tracks and, based on said reproduction signals reproduced by said read head, and
    determining an optimum delay for the signal to be recorded to one of said adjacent tracks relative to the signal to be recorded to the other one of said adjacent tracks.

20. The magnetic recording and reproducing method according to claim 19, wherein said same learning signal is a repetitive signal of a single frequency.

21. The magnetic recording and reproducing method according to claim 18, wherein said phase aligning step includes determining said optimum delay based on an amplitude value of said reproduced signals.

22. The magnetic recording and reproducing method according to claim 18, wherein said phase aligning step includes determining said optimum delay in an increasingly accurate manner through a plurality of steps.

23. The magnetic recording and reproducing method according to claim 18, wherein said phase aligning step includes determining said optimum delay using what is known as the steepest descent method.

* * * * *